United States Patent
Kang et al.

(10) Patent No.: US 8,910,243 B2
(45) Date of Patent: Dec. 9, 2014

(54) AUGMENTED REMOTE CONTROLLER AND METHOD FOR OPERATING THE SAME

(75) Inventors: Mingoo Kang, Seoul (KR); Haengjoon Kang, Seoul (KR); Jongsoon Park, Seoul (KR); Jinyung Park, Seoul (KR); Jongchul Kim, Seoul (KR); Junho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 12/959,714

(22) Filed: Dec. 3, 2010

(65) Prior Publication Data

US 2011/0138444 A1 Jun. 9, 2011

Related U.S. Application Data

(60) Provisional application No. 61/266,956, filed on Dec. 4, 2009.

(30) Foreign Application Priority Data

Apr. 21, 2010 (KR) ........................ 10-2010-0036987

(51) Int. Cl.
*G06F 21/00* (2013.01)
*G06F 21/31* (2013.01)
*G06F 21/10* (2013.01)

(52) U.S. Cl.
CPC ............... *G06F 21/31* (2013.01); *G06F 21/10* (2013.01)
USPC ............... 726/3; 709/222; 380/252; 380/205

(58) Field of Classification Search
CPC ....................................................... G06F 21/10
USPC .................. 726/3; 709/222; 380/205, 252
See application file for complete search history.

(56) References Cited

U.S. PATENT DOCUMENTS

| | | | |
|---|---|---|---|
| 6,037,936 A | 3/2000 | Ellenby et al. | |
| 6,243,054 B1 | 6/2001 | DeLuca | |
| 6,285,362 B1 | 9/2001 | Kikuchi et al. | |
| 6,559,813 B1 | 5/2003 | DeLuca et al. | |
| 6,791,467 B1 * | 9/2004 | Ben-Ze'ev | 340/12.25 |
| 7,610,555 B2 | 10/2009 | Klein et al. | |
| 8,180,396 B2 | 5/2012 | Athsani et al. | |
| 2003/0007104 A1 | 1/2003 | Hoshino et al. | |
| 2003/0034998 A1 | 2/2003 | Kodosky et al. | |

(Continued)

OTHER PUBLICATIONS

Office Action for U.S. Appl. No. 12/959,696 dated Oct. 2, 2012.

(Continued)

*Primary Examiner* — Carl Colin
*Assistant Examiner* — Syed Zaidi
(74) *Attorney, Agent, or Firm* — KED & Associates LLP

(57) ABSTRACT

An image display may be displayed by augmented reality on a remote controller. This may include identifying an electronic device having playable content, receiving information regarding a locked status of the playable content of the identified electronic device, and displaying, on a screen, an object indicating a locked status when the playable content of the identified electronic device requires a user authentication for playing the content. A user authentication input may be received and a determination may be made whether the received user authentication input matches a previously stored user authentication information. The playable content may be released from the locked status when it is determined that the received user authentication input matches the previously stored user authentication information, and information relating to the released playable content may be displayed.

20 Claims, 18 Drawing Sheets

(56) References Cited

U.S. PATENT DOCUMENTS

| | | |
|---|---|---|
| 2004/0243694 A1 | 12/2004 | Weast |
| 2005/0251825 A1 | 11/2005 | Fukuda et al. |
| 2006/0159109 A1 | 7/2006 | Lamkin et al. |
| 2006/0253874 A1 | 11/2006 | Stark et al. |
| 2006/0269056 A1* | 11/2006 | Montag ................ 380/205 |
| 2007/0106721 A1 | 5/2007 | Schloter |
| 2007/0136315 A1 | 6/2007 | Choi et al. |
| 2007/0136778 A1 | 6/2007 | Birger et al. |
| 2007/0150828 A1 | 6/2007 | Tsukada et al. |
| 2007/0198476 A1 | 8/2007 | Farago et al. |
| 2008/0005764 A1 | 1/2008 | Arling et al. |
| 2008/0267459 A1 | 10/2008 | Nakada et al. |
| 2009/0102859 A1 | 4/2009 | Athsani et al. |
| 2009/0167919 A1 | 7/2009 | Anttila et al. |
| 2009/0257591 A1* | 10/2009 | Mithal et al. ........... 380/252 |
| 2009/0300679 A1 | 12/2009 | Hiroi et al. |
| 2010/0082784 A1* | 4/2010 | Rosenblatt et al. ........ 709/222 |
| 2012/0032945 A1 | 2/2012 | Dare et al. |

OTHER PUBLICATIONS

Office Action for U.S. Appl. No. 12/959,730 dated Aug. 15, 2012.

U.S. Office Action for U.S. Appl. No. 12/959,696 dated Mar. 15, 2013.

U.S. Office Action for U.S. Appl. No. 12/959,730 dated Apr. 23, 2013.

U.S. Office Action dated Oct. 9, 2013 for U.S. Appl. No. 12/959,730.

* cited by examiner

AUGMENTED REMOTE CONTROLLER AND METHOD FOR OPERATING THE SAME

CROSS-REFERENCE TO RELATED APPLICATIONS

This application claims benefit and priority from Korean Patent Application No 10-2010-0036987, filed Apr. 21, 2010 and U.S. Provisional Application No. 61/266,956, filed Dec. 4, 2009, the subject matters of which are incorporated herein by reference.

This application is also related to U.S. application Ser. No. 12/959,696 filed Dec. 3, 2010 and U.S. application Ser. No. 12/959,730 filed Dec. 3, 2010, the subject matters of which are incorporated herein by reference.

BACKGROUND

1. Field

Embodiments of the present invention may relate to an augmented remote controller, a method for controlling the augmented remote controller, and/or a system for the same. The augmented remote controller may identify an image display apparatus, an external device connectable to the image display apparatus, contents available from an electronic device (such as the image display apparatus or the external device), and/or other types of objects and the augmented remote controller may display related information. A user may control an object around the user and receive information related to the object by using the augmented remote controller.

2. Background

An image display apparatus may display images viewable to a user. The user can view a broadcast program through the image display apparatus. The image display Apparatus may be connected to an external device. The user can view contents available from the external device through the image display apparatus. The image display apparatus may also be connected to a content provider over a network. The user can view contents available from the content provider through the image display apparatus over the network.

Contents viewable to users through image display apparatuses and information related to the contents are increasing. The users may want to view content-related information as well as contents through the image display apparatuses. Users may also want to efficiently control an image display apparatus and various types of external devices by use of a single remote controller.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
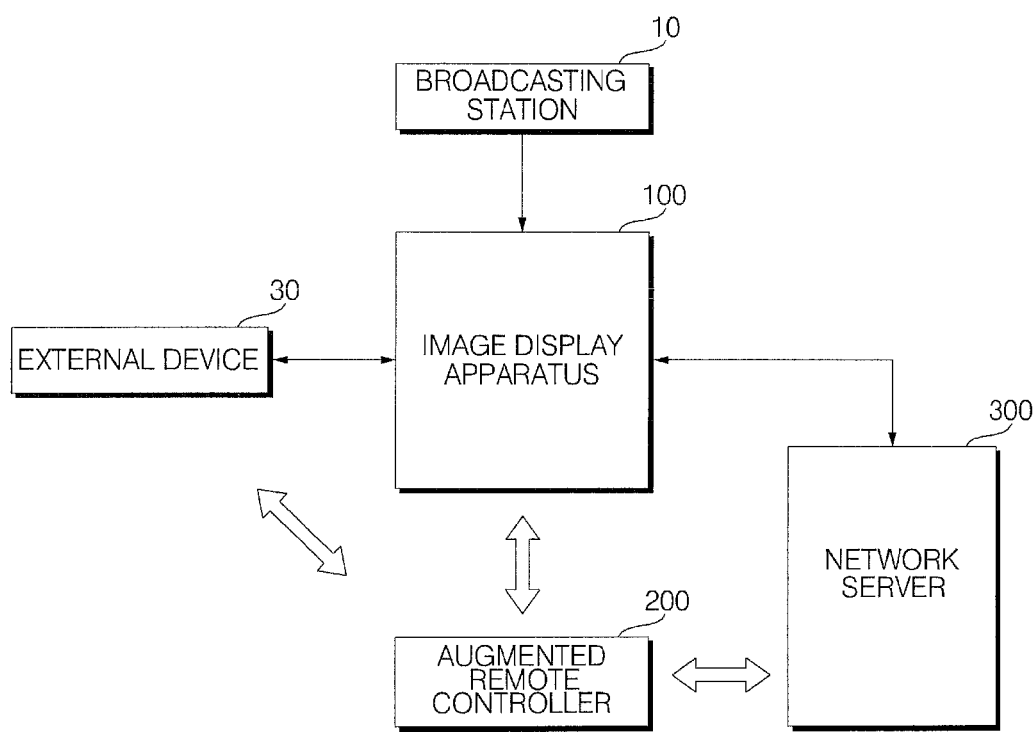
FIG. 1 is a block diagram of an augmented remote control system according to an exemplary embodiment of the present invention.

An embodiment of the present invention may provide a remote controller for enabling a user to efficiently use and manage contents and contents-related information played back or stored in an image display apparatus or an external device connected to the image display apparatus.

A method may be provided for operating an augmented remote controller that provides a user interface by augmented reality, which includes identifying an electronic device having playable contents, receiving lock setting information regarding the playable contents, displaying an object that indicates locked status in presence of a locked content requiring user authentication, and releasing the locked content upon receipt of a user authentication input.

A method may be provided for operating an augmented controller that provides a user interface by augmented reality, which includes receiving a user authentication input, identifying an electronic device, and displaying information regarding contents playable in the electronic device based on the user authentication input.

The terms "module", "unit", and "unit" attached to describe names of components may be used herein to help understanding of components, and thus should not be considered as having specific meanings or roles. Accordingly, the terms "module" and "unit" may be interchangeable in their use.

Embodiments may be described with respect to an augmented remote controller. Embodiments are also applicable to other devices, such as pointing devices, goggles and/or other devices with a display.

According to an exemplary embodiment, an augmented remote controller may identify an object around a user and provide information related to the identified object to the user, thereby offering an augmented reality environment to the user. The object around the user may be an image display apparatus that is controllable using the augmented remote controller, an external device connected to the image display apparatus, contents available from the image display apparatus or the external device, or other types and/or other types of objects.

The augmented remote controller may identify an object around the user by collecting user-related information. For example, the augmented remote controller may collect information regarding location or bearing of the user using a Global Positioning System (GPS) or a compass. Further, the augmented remote controller may capture an image of a real environment of the user by a camera and thus identify an object around the user.

The augmented remote controller may also identify an object around the user using a Radio Frequency Identification (RFID) reader.

The augmented remote controller may identify an object around the user, search for information related to the identified object, and display the detected (or determined) information. The type of the detected (or determined) information may correspond to the type of the identified object.

For example, when the augmented remote controller identifies an image display apparatus or an external device around the user, the augmented remote controller may search for information about a content list available from the image display apparatus or the external device. Additionally, the augmented remote controller may search for information about a user interface through which the image display apparatus or the external device can be controlled. The augmented remote controller may display the detected information about the image display apparatus or the external device to the user.

The augmented remote controller may identify contents provided by an image display apparatus or an external device around the user. The augmented remote controller may search for information about content and display detected information to the user. The augmented remote controller may display a user interface through which the user can edit, play back, and/or transmit contents provided by the image display apparatus or the external device.

The augmented remote controller may identify any other type of object around the user. For example, the user may capture an image of a piece of furniture around the user using a camera provided in the augmented remote controller. The augmented remote controller may identify that the object captured by the camera is a piece of furniture, by referring to a database that stores information about images of a number of objects. The augmented remote controller may search for information regarding the furniture, such as name or manufacturer of the furniture, and display the detected (or determined) information to the user.

The augmented remote controller may augment a real image captured by the camera with detected information about an object captured by the camera. For example, the augmented remote controller may display a real image captured by the camera on a display, search for information about an object included in the displayed real image, and display the detected information about the object on the display using a pop-up window or an icon. Additionally, the augmented remote controller may display the detected information about the object as an image or as text on the display.

The user may view, through the augmented remote controller, the real image augmented with the information detected by the augmented remote controller. The user may identify information about the real image or an object included in the real image by the augmented information overlaid on the real image captured by the camera.

If the display that displays the augmented real image is a touch screen, the user may interact with the augmented remote controller by selecting a pop-up window, an icon, an image, and/or text representing the augmented information. For example, when the user selects a pop-up window representing first augmented information, the augmented remote controller may execute an application related to the first augmented information. The application may be an application that controls an object such as an image display apparatus or an external device included in the augmented real image.

If the augmented remote controller uses a transparent display, the augmented remote controller may display augmented information overlaid on a real image projected onto the transparent display. The augmented remote controller may search for information regarding an object included in the displayed real image and display the detected information as augmented information on the transparent display.

The augmented remote controller may wirelessly transmit signals to and receive signals from an image display apparatus or an external device connectable to the image display apparatus. The user may control the image display apparatus or the external device using the augmented remote controller. The augmented remote controller may receive information about operation status of the image display apparatus or the external device and display the received information on the display.

The augmented remote controller may be connected to a network including the Internet. The augmented remote controller may search for information regarding an identified object through the network and display the detected information on the display.

FIG. 1 is a block diagram of an augmented remote control system according to an exemplary embodiment of the present invention.

As shown in FIG. 1, an augmented remote controller 200 may transmit signals to and receive signals from an image display apparatus 100, an external device 30 connectable to the image display apparatus 100, and/or a network server 300. The image display apparatus 100 can play various kinds of contents, such as playable content. The image display apparatus 100 may receive an external signal including a video signal corresponding to a content. The image display apparatus 100 may extract the video signal from the received signal and display an image corresponding to the extracted video signal.

The external device 30 can play back content that is stored in compliance with a predetermined standard. The external device 30 may include a display. The external device 30 may display an image corresponding to a played content on the display. The external device 30 may be connected to the image display apparatus 100 and may transmit a signal including a video signal corresponding to a content to the image display apparatus 100. The image display apparatus 100 may display an image corresponding to the video signal included in the received signal.

The image display apparatus 100 may receive a broadcast signal from a broadcasting station 10 and display an image corresponding to a video signal included in the broadcast signal. The image display apparatus 100 may also receive a signal including a video signal from the network server 300 over the network including the Internet and display an image corresponding to the video signal included in the received signal.

When the image display apparatus 100 is connected to the Internet, the image display apparatus 100 may receive a signal including a video signal corresponding to a specific content from a content provider on the Internet to provide content over the Internet and the image display apparatus 100 may display an image corresponding to the video signal.

The augmented remote controller 200 may identify or determine the image display apparatus 100 or the external device 30. More specifically, the augmented remote controller 200 may identify the image display apparatus 100 or the external device 30 by capturing an image of a real environment of a user and analyzing the captured image. If an RFID tag is attached to the image display apparatus 100 or the external device 30, the augmented remote controller 200 may receive a signal from the image display apparatus 100 or the external device 30 through an RFID reader and identify the image display apparatus 100 or the external device 30 based on the received signal.

The augmented remote controller 200 may identify or determine the image display apparatus 100 or the external device 30 by transmitting and receiving another type of signal to and from the image display apparatus 100 or the external device 30. For example, the augmented remote controller 200 may transmit and receive InfraRed (IR) or Radio Frequency (RF) signals to and from the image display apparatus 100 or the external device 30. The augmented remote controller 200 may be paired with the image display apparatus 100 or the external device 30, which transmits and receives IR or RF signals. The image display apparatus 100 or the external device 30 may identify a signal received from the paired augmented remote controller 200.

The augmented remote controller 200 may display, on a screen or a display, menus for controlling the identified image display apparatus 100 or external device 30. The user may enter a command to control the image display apparatus 100 or the external device 30 by selecting a menu on the display or by manipulating a button or key of the augmented remote controller 200. The augmented remote controller 200 may transmit a signal carrying the user-input command to the image display apparatus 100 or the external device 30. The image display apparatus 100 or the external device 30 may be controlled by the signal transmitted from the augmented remote controller 200.

The augmented remote controller 200 may identify or determine the image display apparatus 100 or the external device 30 by use of a camera, an RFID reader, etc. The augmented remote controller 200 may identify information related to contents provided by the identified image display apparatus 100 or external device 30 from metadata received from the image display apparatus 100 or the external device 30. The augmented remote controller 200 may also search the network server 300 for information related to the contents provided by the image display apparatus 100 or the external device 30.

The augmented remote controller 200 may display the content-related information on its display. The type of the content-related information may correspond to type of the contents identified by the augmented remote controller 200.

For example, when a shopping-related content is currently provided, the augmented remote controller 200 may search for information about price of an item, name of a product, a store that sells the product, and/or an on-line shopping site in association with the shopping-related content. When a content related to a famous tourist spot is currently provided, the augmented remote controller 200 may search for content-related information such as name of the tourist spot, souvenirs, photos and/or videos of the tourist spot, etc. When the current content is a movie, the augmented remote controller 200 may search for information about a producer, production company, and cast of the movie and/or other movie-related information. The user may set the types of information that the augmented remote controller 200 is to search for based on content types.

Figure 2:
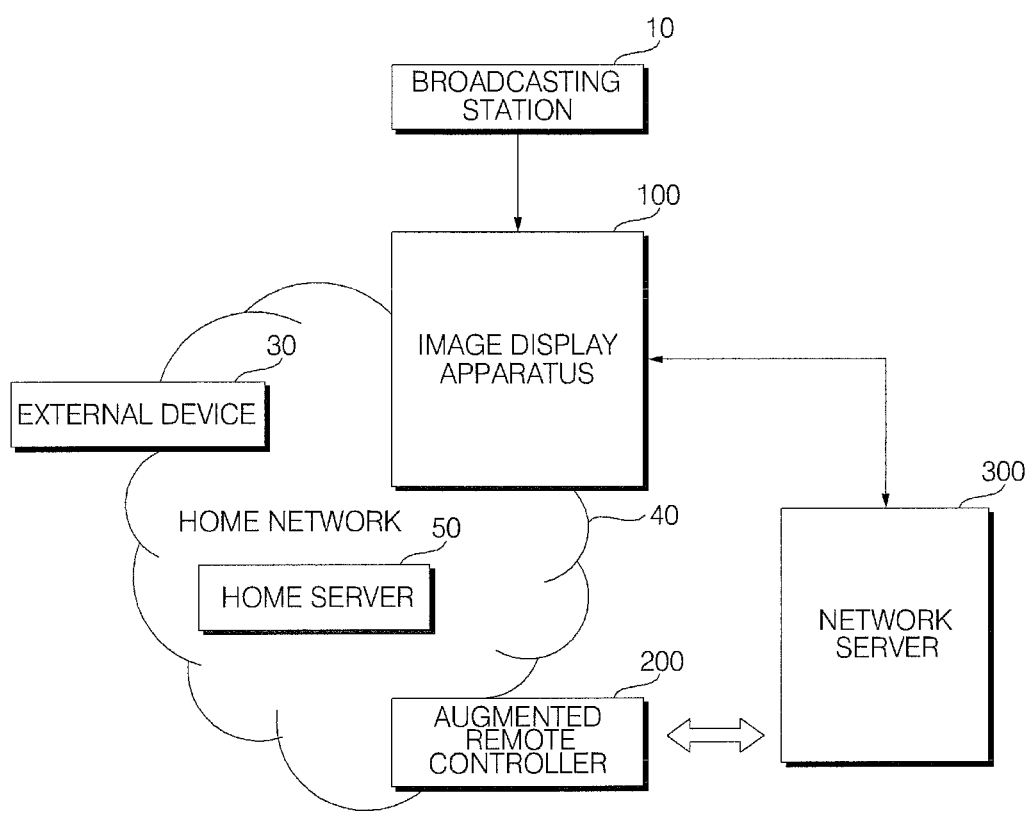
FIG. 2 is a block diagram of an augmented remote control system according to an exemplary embodiment of the present invention.

FIG. 2 is a block diagram of an augmented remote control system according to an exemplary embodiment of the present invention.

The augmented remote controller 200 may directly transmit signals to or receive signals from the image display apparatus 100 and the external device 30. Alternatively or additionally, the augmented remote controller 200 may transmit signals to or receive signals from a home server 50 of a home network 40 connected to the image display apparatus 100 or the external device 30. The home network 40 is a network in which a predetermined number of image display apparatuses 100 or external devices 30 may transmit signals to or receive signals from according to a predetermined network communication standard. The home network 40 may be independent of the network in which the network server 300 including the content provider is built. The home network 40 may be configured in an office or a home.

The home server 50 may store information regarding the image display apparatus 100 and the external network 30 connected to the home network 40. For example, the home server 50 may store information regarding product name, model name, use guide, and available contents of the image display apparatus 100 or the external network 30 connected to the home network 40. The home server 50 may also control signal transmission and reception to and from the home network 40.

The augmented remote controller 200 may identify a type of the image display apparatus 100 or external network 30 connected to the home network 40 by camera, RFID reader, etc. The augmented remote controller 200 may receive information regarding the image display apparatus 100, information regarding the external device 30, and/or information regarding contents available from the image display apparatus 100 or the external device 30, directly from the image display apparatus 100 or the external device 30, through the home server 50, and/or through the network server 300.

The augmented remote controller 200 may display detected information on its display (or screen). Augmented information may be overlaid on an image captured by the camera or a real image projected on the transparent display. The augmented remote controller 200 may display the augmented real image overlapped with the augmented information on the display.

Figure 3:
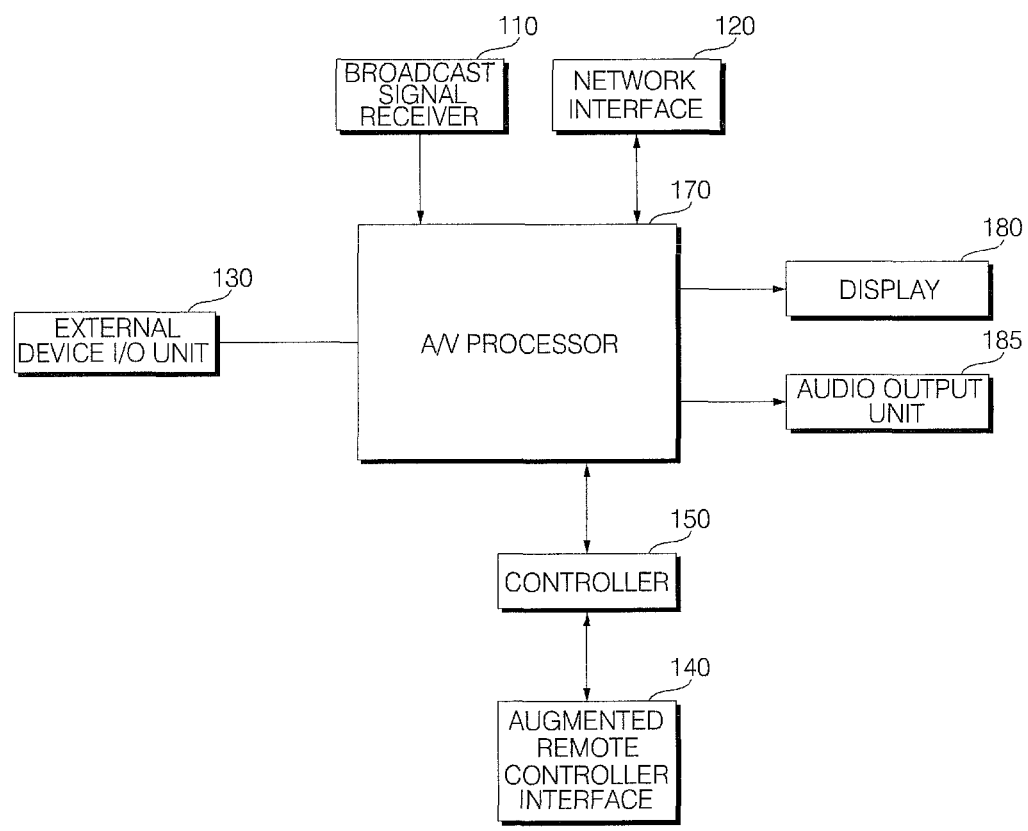
FIGS. 3 and 4 are block diagrams of an image display apparatus according to an exemplary embodiment of the present invention.

FIG. 3 is a block diagram of an image display apparatus according to an exemplary embodiment of the present invention.

As shown in FIG. 3, the image display apparatus 100 may include a broadcast signal receiver 110, a network interface 120, an external device Input/Output (I/O) unit 130, a remote controller interface 140 (or augmented remote controller interface), a controller 150, an A/V processor 170, a display 180, and an audio output unit 185.

The broadcast signal receiver 110 may select an RF broadcast signal corresponding to a channel selected by a user from among a plurality of RF broadcast signals received through an antenna or an RF broadcast signal corresponding to each of pre-memorized channels, and downconvert the RF broadcast signal to a digital Intermediate Frequency (IF) signal or an analog baseband A/V signal.

The broadcast signal receiver 110 may receive RF broadcast signals from an Advanced Television Systems Committee (ATSC) single-carrier system and/or from a Digital Video Broadcasting (DVB) multi-carrier system.

The broadcast signal receiver 110 may sequentially select RF broadcast signals corresponding to all broadcast channels previously memorized in the image display apparatus 100 by a channel-add function from among a plurality of RF signals received through the antenna, and may downconvert the selected RF broadcast signals to IF signals or baseband A/V signals. This operation may be performed to display a thumbnail list that includes a plurality of thumbnail images corresponding to broadcast channels on the display 180. Accordingly, the broadcast signal receiver 110 may receive the RF broadcast signal of the selected channel, and/or may receive the RF broadcast signals of all of the pre-memorized channels sequentially or periodically.

The network interface 120 may interface between the image display apparatus 100 and a wired/wireless network such as the Internet.

The network interface 120 may include a wireless communication module for connecting the image display apparatus 100 wirelessly to the Internet. For wireless Internet connection, the network interface 120 may operate in conformance with communication standards such as Wireless Local Area Network (WLAN) (i.e., Wi-Fi), Wireless Broadband (WiBro), World Interoperability for Microwave Access (WiMax), and/or High Speed Downlink Packet Access (HSDPA).

The network interface 120 may receive content or data from a content provider or a network provider over a network. The received content or data may include contents such as movies, advertisements, games, Video-on-Demand (VoD) files, and broadcast signals, and information related to the contents. The network interface 120 may also receive update information and update files of firmware from the network operator.

The external device I/O unit 130 may interface between the external device 30 and the image display apparatus 100. For interfacing, the external device I/O unit 130 may include an A/V I/O unit (not shown) and/or a wireless communication module (not shown).

The external device I/O unit 130 may be connected wirelessly or wiredly to the external device 30 such as a Digital Versatile Disc (DVD), a Blu-ray disc, a game player, a camera, a camcorder, and/or a computer (e.g. a laptop computer). The external device I/O unit 130 may receive video, audio, and/or data signals from the connected external device 30 and may transmit the received external input signals to the A/V processor 170. Additionally, the external device I/O unit 130 may output video, audio, and/or data signals processed by the A/V processor 170 to the connected external device 30.

To provide video and audio signals received from the external device 30 to the image display apparatus 100, the A/V I/O unit of the external device I/O unit 130 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and/or a D-sub port.

The wireless communication module of the external device I/O unit 130 may perform short-range wireless communication with other external devices. For short-range wireless communication over a network, the wireless communication module may operate in compliance with communication standards such as Bluetooth, RFID, InfraRed Data Association (IrDA), Ultra WideBand (UWB), and ZigBee.

The external device I/O unit 130 may be connected to various set-top boxes through at least one of the Ethernet port, the USB port, the CARS port, the component port, the S-video port, the DVI port, the HDMI port, the RGB port, and/or the D-sub port, and may thus receive data from or transmit data to the various set-top boxes.

For example, in an Internet Protocol TV (IPTV) set-top box, the external device I/O unit 130 may provide video, audio and/or data signals received from the IPTV set-top box to the A/V processor 170 and provide signals processed by the A/V processor 170 to the IPTV set-top box in order to enable interactive communication.

Depending on types of transmission networks, the term "IPTV" may refer to Asynchronous Digital Subscriber Line-TV (ADSL-TV), Very high data rate Digital Subscriber Line-TV (VDSL-TV), Fiber To The Home-TV (FTTH-TV), TV over DSL, Video over DSL, TV over IP (TVIP), Broadband TV (BTV), etc. Additionally, the term "IPTV" may cover Internet TV and full browsing TV.

The external device I/O unit 130 may be connected to a communication network that enables voice calls or video calls. The communication network may be a broadcasting communication network connected by a LAN, a Public Switched Telephone Network (PSTN), and/or a mobile communication network.

The augmented remote controller interface 140 may include a wireless communication module (not shown) for wirelessly transmitting signals to and receiving signals from the augmented remote controller 200, and a coordinate calculator (not shown) for calculating coordinates of a target position to which a pointer should be moved in correspondence with movement of the augmented remote controller 200.

The augmented remote controller interface 140 may wirelessly transmit and receive signals to and from the augmented remote controller 200 through an RF module. The augmented remote controller interface 140 may also wirelessly receive signals from the augmented remote controller 200 through an IR module according to an IR communication standard.

The coordinate calculator of the augmented remote controller interface 140 may correct handshakes or errors in the signal corresponding to movement of the augmented remote controller 200 received through the wireless communication module of the augmented remote controller interface 140. After correcting handshakes or errors, the coordinate calculator may calculate x and y coordinates of the target position at which the pointer should be displayed on the display 180.

The controller 150 may identify a movement or key manipulation of the augmented remote controller 200 from a signal received from the augmented remote controller 200 through the augmented remote controller interface 140 and may thus control an operation of the image display apparatus 100 based on the identified movement or key manipulation.

In another example, the augmented remote controller 200 may calculate coordinates of a target position to which the pointer should be moved in correspondence with movement of the augmented remote controller 200 and may output the calculated coordinates to the augmented remote controller interface 140. The augmented remote controller interface 140 may transmit information regarding the received pointer coordinates to the controller 150 without correcting handshakes or errors.

The controller 150 may provide overall control to the image display apparatus 100. The controller 150 may receive a signal from the augmented remote controller 200 through the augmented remote controller interface 140. The controller 150 may also receive a command through a local key of the image display apparatus 100. Thus, the controller 150 may identify a command included in the received signal or the command corresponding to the manipulated local key and thus control the image display apparatus 100 according to the command.

For example, upon receipt of a command to select a particular channel from the user, the controller 150 may control the broadcast signal receiver 110 to receive a broadcast signal of the selected channel. The controller 150 may control the A/V processor 170 to process a video or audio signal of the selected channel. The controller 150 may also control the A/V processor 170 to output information regarding the selected channel along with the processed video or audio signal to the display 180 or the audio output unit 185.

In another example, the user may enter another type of A/V output command through the augmented remote controller 200. That is, the user may want to view a video signal input from a camera or a camcorder through the external device I/O unit 130, rather than a broadcast signal. In this example, the controller 150 may control the A/V processor 170 to output an audio or video signal received through the USB port of the external device I/O unit 130 to the audio output unit 185 or the display 180.

The image display apparatus 100 may further include a user interface controller for generating a Graphic User Interface (GUI) related to the image display apparatus 100. The controller 150 may perform the function of the user interface controller. In an exemplary embodiment, the user interface controller may be described as a separate component, although other embodiments may also be provided.

A GUI created by the user interface controller may be output to the display 180 or the audio output unit 185 through the A/V processor 170. The GUI may change according to a command included in a signal received from the augmented remote controller 200, a command received through a local key of the image display apparatus 100, and/or an operation of the image display apparatus 100.

For example, upon receipt of a signal from the augmented remote controller 200, the user interface controller may generate a pointer image signal corresponding to movement of the augmented remote controller 200 and output the pointer image signal to the A/V processor 100. The controller 150 may output information about coordinates of a target position to which the pointer should be moved, calculated from the signal received from the augmented remote controller 200, to the user interface controller. The user interface controller may generate the pointer image signal based on the received coordinate information. The A/V processor 170 may perform signal processing such that the pointer corresponding to the pointer image signal created by the user interface controller is displayed on the display 180. The pointer displayed on the display 180 may correspond to the movement of the augmented remote controller 200.

In another example, the user interface controller may generate a user interface image signal including an object corresponding to a command included in a signal received from the augmented remote controller 200, a command input by a local key, and/or an operation of the image display apparatus 100 and output the user interface image signal to the A/V processor 170.

The object may include a widget that is displayed on the display 180 to enter a command to the image display apparatus 100 and/or to represent information related to the image display apparatus 100. The widget may be displayed in On Screen Display (OSD).

The object may be selectable, meaning that additional information exists if selected. Types of objects may include a device object, a content object and a menu object, for example.

The object may be displayed as an image or as text that represents information regarding the image display apparatus 100 or as an image or as text representing an image displayed on the image display apparatus 100, such as a volume level, channel information, a current time, etc. The object may be realized as any other form (e.g. a moving picture) according to type of information that can be or should be displayed on the image display apparatus 100. Objects according to the exemplary embodiment should not be construed as limiting the scope and spirit of the present invention.

A widget is an element by which the user can change particular data on his own or her own on a GUI. For example, a widget may be one of a volume control button, a channel selection button, a menu, an icon, a navigation tab, a scroll bar, a progress bar, a text box, and a window, which are displayed on the display 180. The form of a widget realized in the image display apparatus 100 may vary with the specification of a GUI that can be implemented or should be implemented in the image display apparatus 100. Widgets according to the exemplary embodiments do not limit the present invention.

The A/V processor 170 may process an audio signal and/or a video signal included in a signal received through the broadcast signal receiver 110, the network interface 120, and the external device I/O unit 130 to be suitable for the display 180. The A/V processor 170 may process the audio signal and/or the video signal based on information carried by a data signal received along with the audio signal and/or the video signal.

The A/V processor 170 may process an audio signal and/or the video signal received through the user interface controller so that the audio signal and/or the video signal is output through the display 180 and/or the audio output unit 185. The user may identify the operation status of the image display apparatus 100 or enter a command related to the image display apparatus 100 on a GUI displayed on the display 180 according to the audio signal and/or the video signal generated from the user interface controller.

The A/V processor 170 may select an audio signal and/or a video signal to be processed according to a user command received through the controller 150. The audio signal and/or the video signal processed by the A/V processor 170 are output through the audio output unit 185 and/or the display 180. The user command may be a broadcast channel selection command, a command to select a content to be played from among content input to the image display apparatus 100, and/or the like.

In accordance with an exemplary embodiment, the A/V processor 170 may process a video signal so that an external input two-dimensional (2D) or three-dimensional (3D) video signal is displayed on the display 180. The A/V processor 170 may process a video signal such that a user interface created by the user interface controller is displayed in 3D on the display 180. The A/V processor 170 may be described below in great detail with reference to FIG. 4.

The display 180 may generate a driving signal by converting a video signal, a data signal, and/or an OSD signal processed by the A/V processor 170, or a video signal and/or a data signal received through the external device I/O unit to an RGB signal. The display 180 may be any one of various types of displays such as a Plasma Display Panel (PDP), a Liquid Crystal Display (LCD), an Organic Light Emitting Diode (OLED), and/or a flexible display. According to an exemplary embodiment, the display 180 may be capable of displaying 3D images.

For 3D visualization, the display 180 may be configured into an auto-stereoscopic 3D display (glasses-free) and/or a traditional stereoscopic 3D display (with glasses).

Auto-stereoscopy is a method of displaying 3D images without any auxiliary device, for example, special polarization glasses on the part of a user. Thus, the display 180 may display 3D images on its own. Renticular and parallax barrier are examples of auto-stereoscopic 3D imaging.

The traditional stereoscopy may require an auxiliary device besides the display 180 in order to display 3D images. The auxiliary device may be a Head Mount Display (HMD) type, a glasses type, etc. As special 3D glasses, there are polarization glasses, shutter glasses, and a spectrum filter.

The display 180 may also be implemented as a touch screen so that it is used not only as an output device, but also as an input device.

The audio output unit 185 may receive a processed audio signal (e.g. a stereo signal, a 3.1-channel signal or a 5.1-channel signal) from the A/V processor 170 and output the received audio signal as voice. The audio output unit 185 may be implemented as any of various types of speakers.

Figure 4:
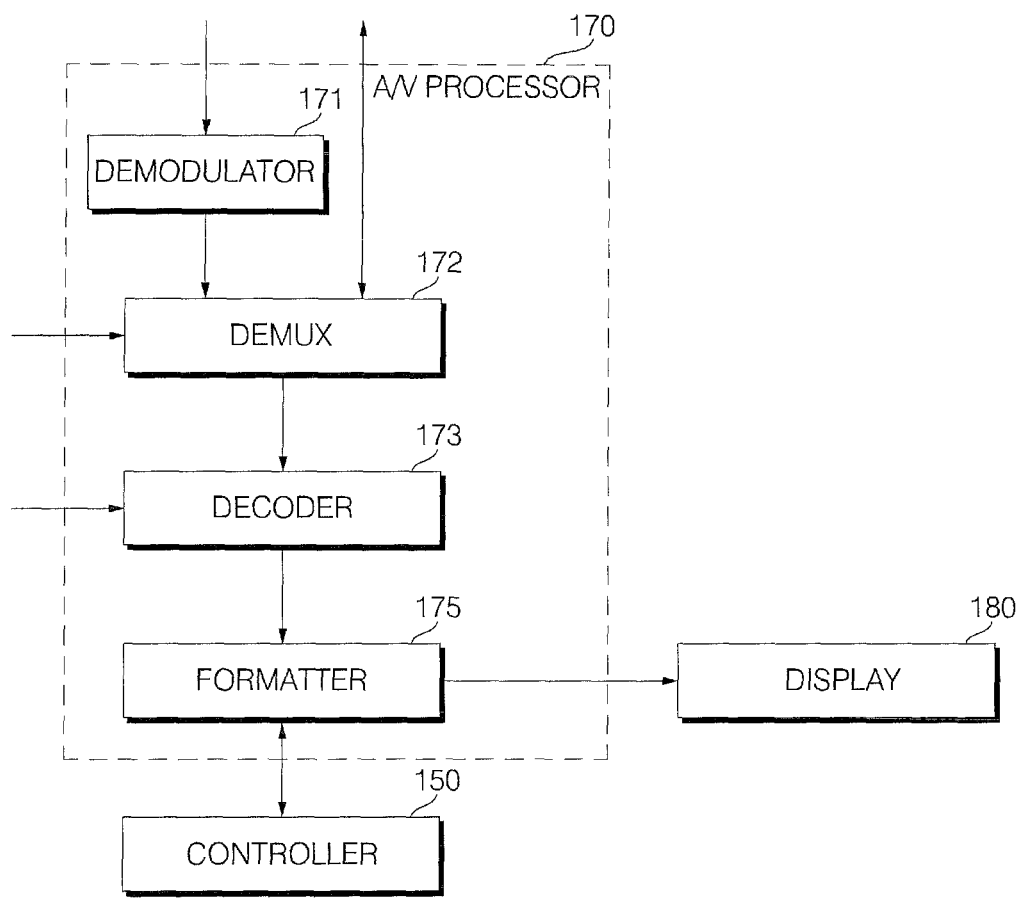

FIG. 4 is a block diagram of an A/V processor in an image display apparatus according to an exemplary embodiment of the present invention.

As shown in FIG. 4, the A/V processor 170 may include a demodulator 171, a Demultiplexer (DEMUX) 172, a decoder 173, and a formatter 175.

The demodulator 171 may demodulate a broadcast signal received from the broadcast signal receiver 110. For example, the demodulator 171 may receive a digital IF signal DIF from the broadcast signal receiver 110 and demodulate the digital IF signal DIF. The demodulator 171 may also perform channel decoding. For channel decoding, the demodulator 171 may include a convolutional decoder (not shown), a deinterleaver (not shown) and a Reed-Solomon decoder (not shown), and perform convolutional decoding, de-interleaving and Reed-Solomon decoding.

The demodulator 171 may perform demodulation and channel decoding on the digital IF signal received from the broadcast signal receiver 110, thereby obtaining a stream signal TS. The stream signal TS may be a signal in which a video signal, an audio signal and/or a data signal are multiplexed. For example, the stream signal TS may be an Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 171 may include an ATSC demodulator and a DVB demodulator. The demodulator 171 may output the stream signal TS to the DEMUX 172.

The DEMUX 172 may demultiplex the stream signal TS, for example, an MPEG-2 TS into an audio signal, a video signal, and a data signal. The DEMUX 172 may receive the stream signal from the demodulator 171, the network interface 120, and/or the external device I/O unit 130.

The data signal obtained by demultiplexing the input stream signal may be a coded data signal. The coded data signal may include Electronic Program Guide (EPG) information that provides broadcasting information such as titles and start and end times of broadcast programs played on each broadcast channel. For example, the EPG information may be ATSC-Program and System Information Protocol (TSC-PSIP) information in case of ATSC, whereas it may be DVB-Service Information (DVB-SI) in case of DVB.

The decoder 173 may decode the demultiplexed signals. In this exemplary embodiment, the decoder 173 may include a video decoder for decoding the demultiplexed video signal, and a scaler for controlling resolution of the decoded video signal to a resolution level at which the decoded video signal can be output in the image display apparatus 100.

In accordance with an exemplary embodiment, the A/V processor 170 may further include a mixer for mixing an external video signal input to the image display apparatus 100 with a video signal generated from the user interface controller. While the mixer may be incorporated into the formatter 175 in function, the mixer may be described herein as separate from the formatter 175, for ease of convenience. The display 180 may display an image based on a mixed video signal. The mixer may output the mixed video signal to the formatter 175.

The formatter 175 may identify a format of the mixed video signal referring to a data signal related to the video signal. The formatter 175 may convert the video signal to a format suitable for the display 180 and output the converted video signal to the display 180.

In this exemplary embodiment, the image display apparatus 100 may display a 3D image on the display 180. The formatter 175 may create a 3D video signal in a predetermined format by separating the mixed video signal into multi-view point image signals and may output the 3D video signal to the display 180. The display 180 may display a 3D image based on the 3D video signal.

A 3D image may be formed with multi-viewpoint images. The user may view the multi-viewpoint images with his or her left and right eyes. Disparity between the multi-viewpoint images viewed by the left and right eyes may provide the illusion of 3D to the user. The multi-viewpoint images that form the 3D image may be a left-eye image perceivable to the left eye and a right-eye image perceivable to the right eye.

The format of a 3D video signal may be determined according to the laybut of the left-eye and right-eye images of the 3D video signal. The left-eye and right-eye images may be provided on the left and right sides, respectively. This may be called a side by side format. The left-eye and right-eye images may be arranged vertically in a top-down format. A time-division layout of the left-eye and right-eye images may be called a frame sequential format. The left-eye and right-eye images may alternate with each other line by line. This may be called an interlaced format. The left-eye and right-eye images may be mixed in the form of boxes in a checker box format.

A video signal included in an external signal input to the image display apparatus 100 and a GUI video signal created from the user interface controller may be 3D video signals with which 3D images are realized. The mixer may mix these 3D video signals and output the mixed 3D video signal to the formatter 175.

The formatter 175 may identify the format of the mixed 3D video signal referring to a related data signal. The formatter 175 may process the 3D video signal according to the identified format and output the processed 3D video signal to the display 180. If limited 3D image formats are available to the display 180, the formatter 175 may convert the received 3D video signal to a 3D image format in which the display 180 can display a 3D image and output the converted 3D video signal to the display 180.

If the formatter 175 fails to identify the format of the mixed video signal referring to the related data signal, it may use a predetermined algorithm to thereby identify the format. For example, the formatter 175 may identify the format of an input 3D video signal by analyzing edges of an image created based on the input 3D video signal.

If the input mixed video signal is a 2D video signal that allows 2D visualization, the formatter 175 may generate a 3D video signal using a 2D-3D conversion algorithm.

Figure 5:
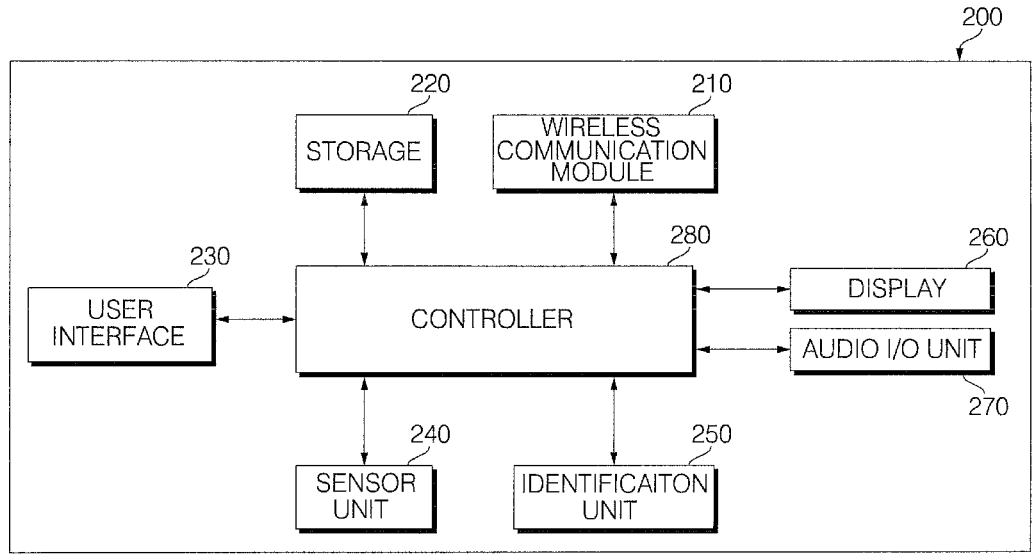
FIG. 5 is a block diagram of an augmented remote controller according to an exemplary embodiment of the present invention.

FIG. 5 is a block diagram of the augmented remote controller 200 according to an exemplary embodiment of the present invention.

Referring to FIG. 5, the augmented remote controller 200 may include a wireless communication module 210, a storage 220 (or memory), a user interface 230, a sensor unit 240, an identification unit 250, a display 260, an audio I/O unit 270, and a controller 280.

The wireless communication module 210 may transmit signals to and receive signals from electronic devices such as the image display apparatus 100, the external device 30, the home server 50, and/or the network server 300. The auaugmented remote controller 200 may further include an RF module for transmitting signals to and receiving signals from an adjacent device in compliance with an RF communication standard. The augmented remote controller 200 may also include an IR module for transmitting signals to and receiving signals from an adjacent device in compliance with an IR communication standard.

The augmented remote controller 200 may communicate with other electronic devices according to other various communication standards. Besides the wireless communication module 210, the augmented remote controller 200 may have a module suitable for signal transmission and reception based on a particular communication standard. The wireless communication module 210 may transmit and receive signals in Bluetooth, RFID, IrDA, UWB, and/or ZigBee, for example.

The wireless communication module 210 may transmit signals to and receive signals from the Internet by various wireless Internet standards and thus may be equipped with modules for signal transmission and reception based on particular wireless Internet standards. Wireless Internet standards available to the augmented remote controller 200 may include WLAN, WiBro, WiMax and HSDPA, for example.

In the exemplary embodiment, the augmented remote controller 200 may transmit a signal carrying information about an operation of the augmented remote controller 200 to an electronic device through the wireless communication module 210. The augmented remote controller 200 may also receive a signal from the electronic device through the RF module. The augmented remote controller 200 may transmit commands such as a power on/off command, a channel change command, and/or a volume change command to the electronic device through the IR module.

The storage 220 (or memory) may store a number of programs and application data required for controlling or operating the augmented remote controller 200. If the augmented remote controller 200 wirelessly transmits signals to and receives signals from an electronic device through the RF module, the augmented remote controller 200 and the electronic device may exchange signals with each other in a predetermined frequency band. The controller 280 may store information regarding a frequency band in which the augmented remote controller 200 can wirelessly communicate with a paired adjacent device in the storage 220 and thus may later refer to the stored information.

The user interface 230 may include a keypad or a plurality of buttons. A user may enter commands to the image display apparatus 100 by manipulating the user interface 230. If the user interface 230 includes a plurality of hard-key buttons, the user may input various commands to the image display apparatus 100 by pressing the hard-key buttons. Alternatively or additionally, if the user interface 230 includes a touch screen displaying a plurality of soft keys, the user may input various commands to the image display apparatus 100 by touching the soft keys. The user interface 230 may also include various input tools other than those set forth herein, such as a scroll key and/or a jog key.

The sensor unit 240 may include sensors for collecting information regarding a user that uses the augmented remote controller 200. The sensor unit 240 may include a GPS, a compass, a gyro sensor, an acceleration sensor, and/or an IR sensor. The GPS may be used to locate the user and the compass may be used to determine the bearing of the user. The gyro sensor may sense movement of the augmented remote controller 200 (for example, in X-, Y-, and Z-axis directions), and the acceleration sensor may sense a moving speed of the augmented remote controller 200.

The augmented remote controller 200 may identify an object around (or about) the user, referring to the user-related information collected by the sensor unit 240. The augmented remote controller 200 may also identify a user's gesture, referring to the collected user-related information. The augmented remote controller 200 may be controlled based on a command corresponding to the user's gesture. If the command corresponding to the user's gesture is a command to control an electronic device, the augmented remote controller 200 may transmit a signal carrying the control command to the electronic device.

The identification unit 250 may identify (or determine) an object around (or about) the user, such as an electronic device. The identification unit 250 may include a camera, an RFID reader, an IR sensor, etc. The identification unit 250 may capture an image of the object using the camera. The captured image of the object may be compared with images of various objects stored in the storage 220, the home server 50, and/or the network server 300. The identification unit 250 may analyze a pattern of the image and extract information about an object corresponding to an image with a pattern matching with the pattern of the captured image, thereby identifying (or determining) the object.

The identification unit 250 may also identify an object by reading an RFID tag attached to the object using the RFID reader. Alternatively or additionally, the identification unit 250 may determine presence or absence of any object around the user using the IR sensor. The augmented remote controller 200 may refer to information regarding objects matching user positions or bearings. The information regarding the objects matching the user positions or bearings may be stored in the storage 220, the home server 50, and/or the network server 300.

The identification unit 250 may identify a current location and bearing of user based on the user-related information collected by the sensor unit 240 and may extract information about an object whose presence was sensed by the IR sensor, corresponding to the user location and bearing, from the stored information regarding objects, thus identifying the object around the user (or about the user). For example, the augmented remote controller 200 may refer to map information including information regarding buildings corresponding to user locations and bearings. In this example, the augmented remote controller 200 may identify a building around the user, referring to information regarding objects corresponding to the location and bearing of the user that is carrying the augmented remote controller 200 in the map information.

The identification unit 250 may also identify a face, finger print, and/or iris of a person captured by the camera. The identification unit 250 may identify the person by comparing a pattern of the identified face, finger print, and/or iris with stored patterns of faces, finger prints, and/or irises. The controller 280 may search for information regarding an object identified by the identification unit 250. For example, if the identification unit 250 identifies a person, the controller 280 may search for information regarding the person such as name, age, and preferred contents of the person and output the detected information.

The audio I/O unit 270 may recognize the user by receiving a voice signal from the user.

The display 260 and the audio I/O unit 270 may output an image and a sound corresponding to a manipulation of the user interface 230 or a signal received from an electronic device such as the image display apparatus 100, the external device 30, the home server 50, and/or the network server 300. Thus, the user may determine from the display 260 and the audio I/O unit 270 whether the user interface 230 has been manipulated or the electronic device has been controlled.

The audio I/O unit 270 may be configured separately as an audio input unit and an audio output unit.

The display 260 may display information regarding an object included in an image captured by the camera. The display 260 may display an augmented real image obtained by superimposing detected augmented information on the captured image. In another example, if the display 260 is implemented as a transparent display with a transparent panel, the user may view a real image of his or her environment on the transparent display 260. The augmented remote controller 200 may search for information regarding an object included in the real image displayed on the transparent display 260 and thus may display the determined object-related information on the transparent display 260.

The controller 280 may superimpose the augmented information on the captured image and may thus output the augmented real image to the display 260. The controller 280 may output an augmented information-related video signal to the display 260 so that the augmented information about the object included in the real image projected onto the transparent display 260 may be superimposed on the real image. The controller 280 may provide overall control to the augmented remote controller 200.

The controller 280 may transmit a signal corresponding to a manipulation of a particular key of the user interface 230 or a signal corresponding to an operation of the augmented remote controller 200 sensed by the sensor unit 240 to an electronic device through the wireless communication module 210.

The block diagrams of the image display apparatus 100 and the augmented remote controller 200 shown in FIGS. 3, 4 and 5 are exemplary embodiments. Depending on specifications of the image display apparatus 100 and the augmented remote controller 200 in real implementation, some components of the image display apparatus 100 and the augmented remote controller 200 may be incorporated or omitted, and/or new components may added to the image display apparatus 100 and the augmented remote controller 200. That is, two or more components may be incorporated into one component or one component may be configured as separate components, when needed. Additionally, a function of each block may be described for the purpose of describing exemplary embodiments, and thus specific operations or devices should not be construed as limiting the scope and spirit of the present invention.

Figure 6:
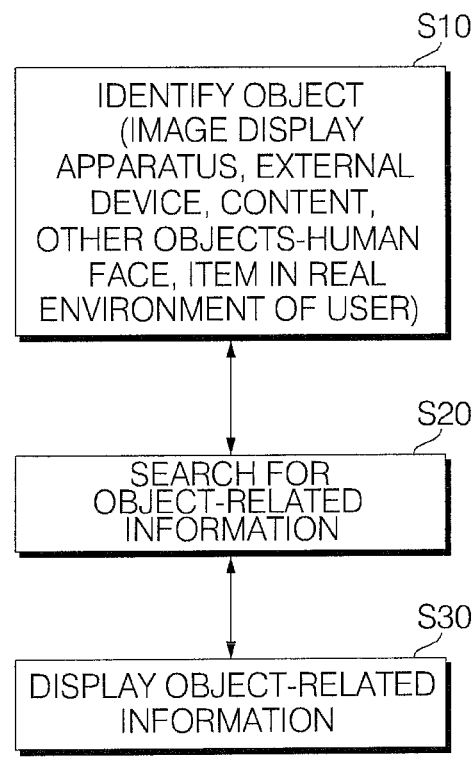
FIG. 6 is a flowchart illustrating a method for operating an augmented remote controller according to an exemplary embodiment of the present invention.

FIG. 6 is a flowchart illustrating a method for operating the augmented remote controller 200 according to an exemplary embodiment of the present invention. Other operations, orders of operations and embodiments are also within scope of the present invention.

As shown in FIG. 6, the augmented remote controller 200 may identify (or determine) an object around a user (or about a user) in operation S10, search for information related to the identified object in operation S20, and display the determined object-related information in operation S30.

The augmented remote controller 200 may identify various types of objects around the user. The user may select an intended type of object through the augmented remote controller 200. For example, the user may select an electronic device so that the augmented remote controller 200 may identify or determine the electronic device. The augmented remote controller 200 may identify the electronic device around the user by using an RFID tag attached to the electronic device.

The user may select contents available from the image display apparatus 100 or the external device 200 as objects to be identified (or determined). The augmented remote controller 200 may identify or determine a content provided by the image display apparatus 100 or the external device 200 using metadata received from the image display apparatus 100, the external device 30, and/or the home server 50. That is, if an identification device such as the camera or RFID reader provided in the augmented remote controller 200 points to the image display apparatus 100, the augmented remote controller 200 may identify the image display apparatus 100 playing a content (i.e., playable content) that the user wants to be identified, and the augmented remote controller 200 may then identify the content being played in the image display apparatus 100 based on metadata related to the image display apparatus 100.

Additionally, the user may select a person for identification. In this example, the augmented remote controller 200 may read a face, finger print, and/or iris of the person by use of the camera, a finger print identifier, and/or an iris identifier in the identification unit 250. The augmented remote controller 200 may identify the person by comparing the read information with information about the faces, finger prints, and/or irises of persons stored in a database.

The augmented remote controller 200 may also recognize a person from a voice input of the person.

The user may also select an object around (or about) him or her (e.g. a building, furniture, etc.). In this example, the augmented remote controller 200 may collect information about location or bearing of the user by GPS or compass. The augmented remote controller 200 may also capture an image of the object using the camera and identify the captured object, by referring to image information about objects corresponding to the current user location or bearing in the database that stores information about objects by user location and bearing.

Information that the augmented remote controller 200 refers to for identifying an object may be stored in the image display apparatus 100, the external device 30, the storage 220 (of the augmented remote controller 200), the home server 50, and/or the network server 300. Thus, the augmented remote controller 200 may search for information regarding an identified object in the image display apparatus 100, the external device 30, the storage 220 (of the augmented remote controller 200), the home server 50, and/or the network server 300.

For example, when the augmented remote controller 200 identifies or determines the image display apparatus 100 or the external device 30, the augmented remote controller 200 may search for a list of contents being played in the image display apparatus 100 or the external device 30. The augmented remote controller 200 may also search for a list of contents stored in the image display apparatus 100 or the external device 30. Additionally, the augmented remote controller 200 may search for information regarding a broadcast signal received at the image display apparatus 100. The augmented remote controller 200 may also search for information including menus with which to control the image display apparatus 100 or the external device 30.

When the augmented remote controller 200 identifies or determines a content being played or stored in the image display apparatus 100 or the external device 30, the augmented remote controller 200 may search for information related to the content. The content-related information may be a title of the content, shopping information for the content, etc.

If the augmented remote controller 200 identifies or determines a person, the augmented remote controller may search for information regarding the person. The person-related information may specify a name, an age, a job and/or a phone number of the person, contents that the person prefers, and/or a history of contents that the person has viewed.

If the augmented remote controller 200 identifies or determines a real object around the user (e.g. a building, furniture, etc.), the augmented remote controller 200 may search for information related to the object. The object-related information may specify name, manufacturer, price, store, and/or use guide of the object.

The augmented remote controller 200 may display the determined (or detected) information on the display 260. The determined information may be displayed in a pop-up window or as an icon. The determined information may be displayed as an image or as text. The augmented remote controller 200 may display the determined augmented information superimposed on an image captured by the camera.

The controller 280 may configure a screen of the display 260 that determined information does not overlap with an object corresponding to the determined information from among the objects included in the real environment of the user. When displaying augmented information on the transparent display, the controller 280 may also configure a screen of the display 260 such that the augmented information is displayed without being overlapped with an object corresponding to the augmented information.

Figure 7:
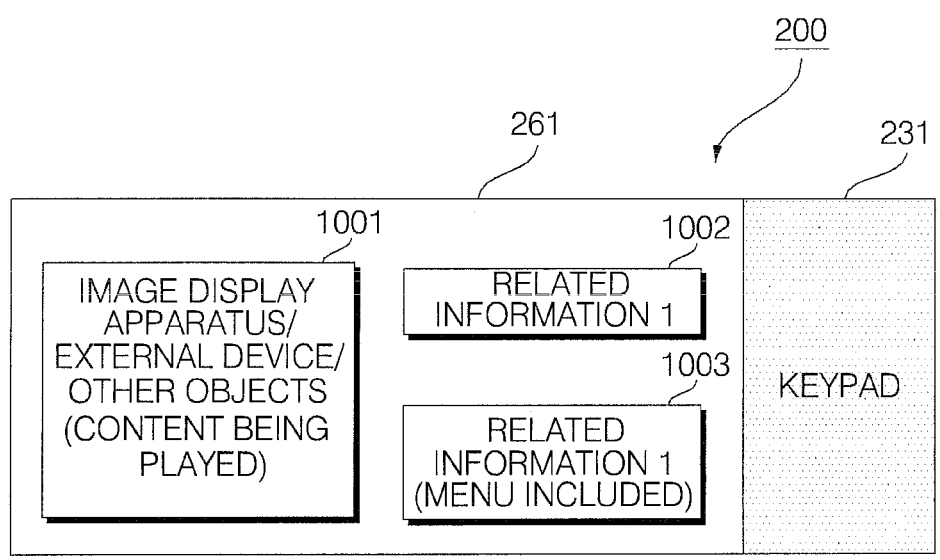
FIG. 7 illustrates an exterior of an augmented remote controller according to an exemplary embodiment of the present invention.

FIG. 7 illustrates an exterior of the augmented remote controller 200 according to an exemplary embodiment of the present invention.

As shown in FIG. 7, a screen 261 displayed on the display 260 of the augmented remote controller 200 may include an object 1001 identified by the augmented remote controller 200 and object-related information 1002 and 1002, which is information about the identified object 1011.

In this exemplary embodiment, the object 1001 identified by the augmented remote controller 200 may be a real image of an object captured by the camera of the augmented remote controller 200. The object-related information 1002 and 1003 may be augmented information including information determined (or detected) by the augmented remote controller 200. As shown in FIG. 7, the augmented remote controller 200 may display the augmented information together with the real image of the object on the screen 261. The user may identify information regarding the captured object from the augmented information included in the screen 261.

The object-related information may include a menu for controlling the object. In the exemplary embodiment, the second object-related information 1003 (related information 2) may be a menu by which a command may be input to the image display apparatus 100 or the external device 30. The related information 2 may also be a menu by which the current playback of a content may be discontinued or the content may be transmitted to another electronic device.

When the screen 261 is displayed on a touch screen, the user may select the object-related information 1002 and 1003 on the screen 261 by touching the touch screen. Additionally, the user may enter a command (corresponding to a particular icon) to the augmented remote controller 200 by selecting the icon in the menu included in related information 2 displayed on the screen 261.

The augmented remote controller 200 may also include a keypad 231. The user may enter a particular command to the augmented remote controller 200 by manipulating a predetermined key of the keypad 231.

Figure 8:
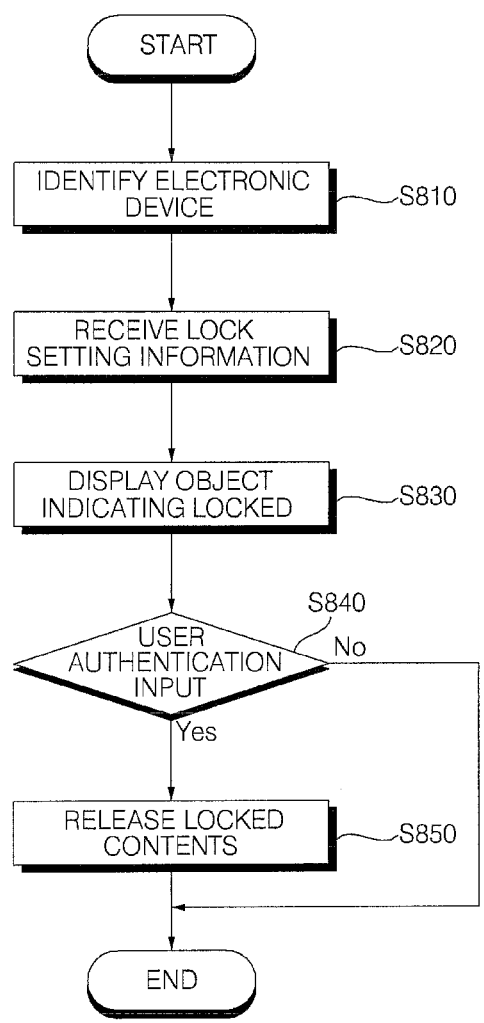
FIG. 8 is a flowchart illustrating a method for operating an augmented remote controller according to an exemplary embodiment of the present invention.

FIG. 8 is a flowchart illustrating a method for operating an augmented remote controller according to an exemplary embodiment of the present invention. FIGS. 9 to 15 are views for describing operations of an augmented remote controller according to exemplary embodiments of the present invention. Other embodiments and configurations are also within the scope of the present invention.

As shown in FIG. 8, the augmented remote controller 200 that provides a user interface by augmented reality may identify (or determine), in operation S810, an electronic device having playable contents by using the above-described identification unit 250.

The electronic device may be an image display apparatus, an external device connectable to the image display apparatus, an external device that stores contents, and/or a storage.

In an exemplary embodiment, once an electronic device is identified (or determined), contents may be automatically searched for in the electronic device and the content may be displayed. Alternatively, upon receipt of a search command, the augmented remote controller 200 may search for content in the electronic device.

Figure 9:
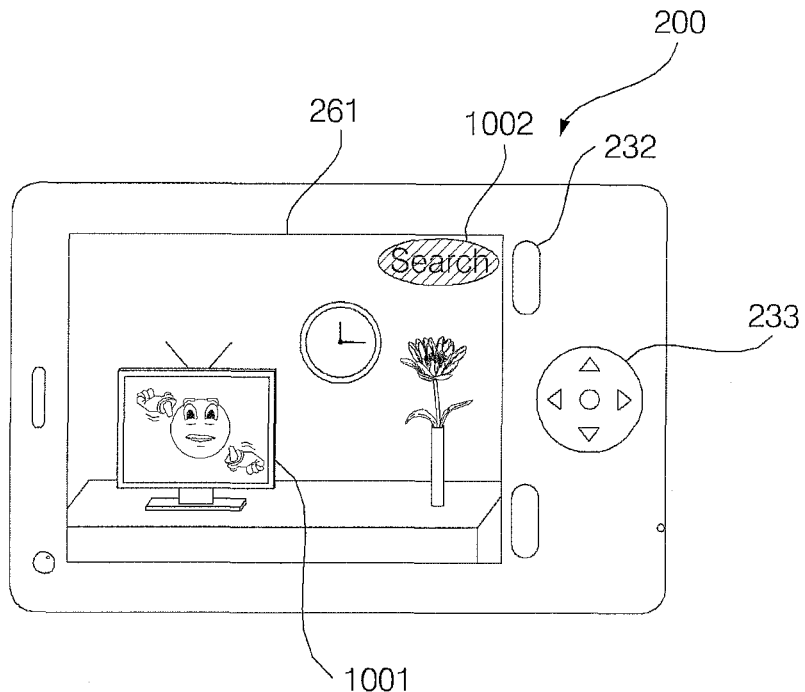
FIGS. 9 to 20 are views for describing operations of an augmented remote controller according to exemplary embodiments of the present invention.

Referring to FIG. 9, the augmented remote controller 200 may include buttons 232 and a keypad 233 that the user can manipulate. The augmented remote controller 200 may further include a screen 261 for identifying an external object and displaying determined information about the identified object. The augmented remote controller 200 having a transparent display may display a real environment projected on the transparent display and the determined information (or detected information) regarding the identified object on the screen 261. The augmented remote controller 200 may display an image of a real environment captured by the camera and the determined information regarding the identified object on the screen 261.

In this exemplary embodiment, the augmented remote controller 200 may display an image of a real environment captured by the camera and determined information regarding an object on the screen 261.

The camera of the augmented remote controller 200 may capture an environment opposite to the user with respect to the augmented remote controller 200.

Among objects displayed on the screen 261, a first object 1001 may represent the image display apparatus 100, which is an electronic device controllable by the augmented remote controller 200.

In an exemplary embodiment, the image display apparatus 100 may be powered-on or powered-off. The augmented remote controller 200 may determine, for example, from a marker attached to the image display apparatus 100 that a current object captured by the camera is the image display apparatus 100. In another exemplary embodiment, the augmented remote controller 200 may determine from a pattern of a captured image of the image display apparatus 100 that an object included in a current image captured by the camera is the image display apparatus 100.

In another exemplary embodiment, the augmented remote controller 200 may transmit a signal to and receive a signal from the image display apparatus 100 according to a predetermined wireless communication standard. In this example, the augmented remote controller 200 may determine from metadata included in a received signal that a target device that has transmitted the signal is the image display apparatus 100. The augmented remote controller 200 may transmit signals to and receive signals from a target device by IR or RF communication.

The augmented remote controller 200 may identify or determine a target device through the home server 50 that stores information about the target device. That is, the augmented remote controller 200 may receive information regarding a current object projected onto the transparent display or captured by the camera from the home server 50 and acquire information about the type of the target device and contents stored or played in the target device.

The user may search for content that can be played in the target device through the augmented remote controller 200. As shown in FIG. 9, the augmented remote controller 200 may display a second object 1002 for enabling the user to enter a keyboard display command to the screen 261. When the user touches the second object 1002 or manipulates an Enter key of the keypad 233 with the second object 1002 activated, the keyboard display command may be input to the augmented remote controller 200.

Figure 10:
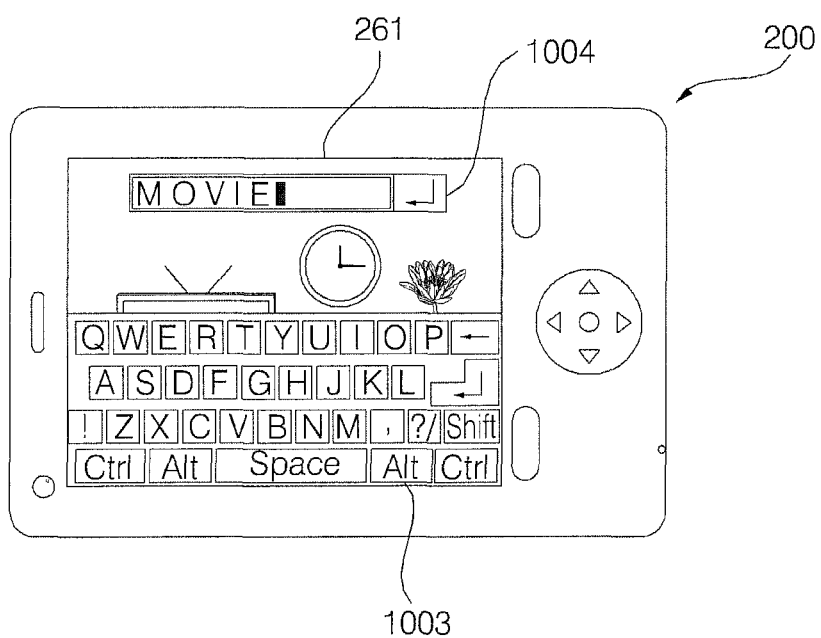

FIG. 10 shows an image displayed on the screen 261 of the augmented remote controller 200 in response to the augmented remote controller 200 receiving the keyboard display command. Referring to FIG. 10, the augmented remote controller 200 may display a third object 1003 representing a keyboard and a fourth object 1004 for displaying a character input through the third object 1003.

The user may enter a keyword related to intended contents through the third object 1003. The keyword may be displayed on the fourth object 1004. The user may want to search for movie-related contents that can be displayed in the image display apparatus 100, which is a target device, and other electronic devices. Accordingly, the user may enter a keyword 'MOVIE' through the third object 1003 and thus the keyword 'MOVIE' may be displayed on the fourth object 1004.

Referring to FIG. 8, the wireless communication module 210 may receive lock setting information regarding the playable contents in operation S820. The augmented remote controller 200 may determine whether the playable contents have been set as locked (or in a locked status), when it identifies (or determines) the electronic device that stores the playable contents or when it searches for the contents corresponding to the input user command in the electronic device. The augmented remote controller 200 may determine whether a content based on a broadcast signal or a video signal input to the electronic device has been set as locked (or is in a locked status). When playable content is set as locked (or is in a locked status), the playable content is considered as being in a locked status until being released based on a user authentication process.

The playable contents may be contents stored in the electronic device and/or contents based on signals received at the electronic device.

A locked status or a non-locked status may be determined from metadata related to the contents, which is received through the electronic device. That is, lock setting information regarding the contents may be included in the metadata.

The lock setting information may be received directly from the electronic device.

If the augmented remote controller 200 search for contents or content-related information stored in an electronic device connected to a network through a network server or a home server, the augmented remote controller 200 may determine whether the contents or the content-related information has been set as locked (or is in a locked status) based on content-related metadata received from the network server or the home server.

That is, the method for operating the augmented remote controller may include accessing the network server or the home server of the home network over a wireless communication network, and receiving lock setting information from the network server or the home server.

In an exemplary embodiment, the augmented remote controller may determine contents that are set as locked (or in a locked status) during searching for contents stored in the electronic device, such as the image display apparatus or the external device.

Information required for releasing locked contents may be stored on a content basis. The information required for releasing locked content may include user authentication information such as a password, information about a user's finger print, and/or information about a user's iris, for example.

The locked contents may contents on which an age limit is enforced for viewing by rating or may be contents that the user has set as locked.

The contents set as locked (or in a locked status) may include contents having an age limit from among broadcast contents received in the image display apparatus, contents having an age limit from among contents provided by a content provider that may be included in the network server, or contents set as locked by the user from among contents stored in the image display or the external device.

In presence of content that have been set as locked (and thus require user authentication), the controller 280 may control the display to display, in operation S830, displayed object indicating that the contents are locked.

The augmented remote controller 200 may display an icon indicating a locked status, rather than displaying content-related information.

Figure 11:
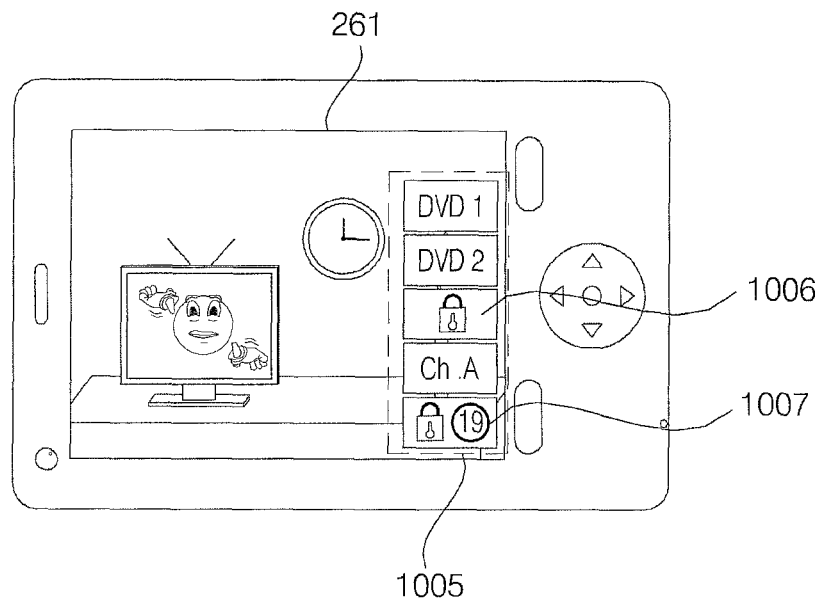
Figure 12:
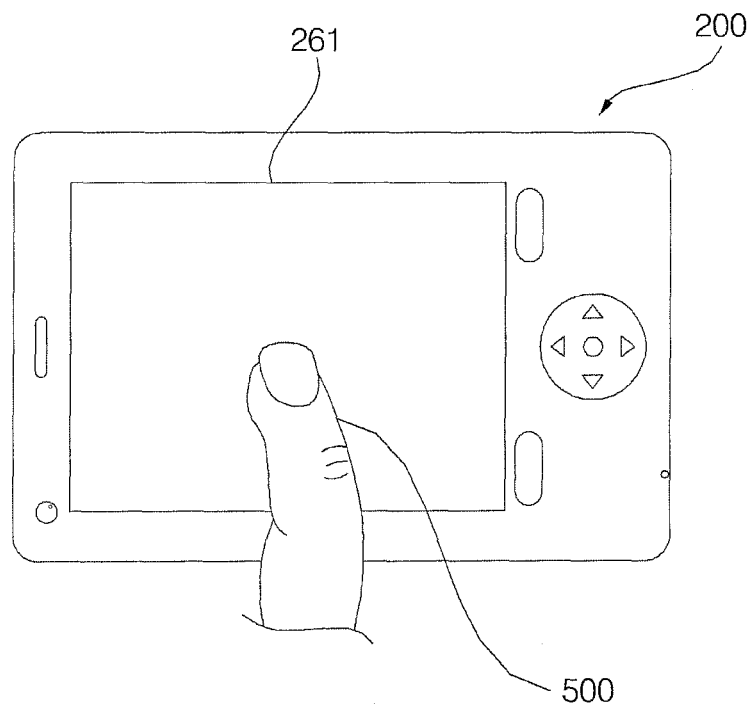

As shown in FIG. 11, an object 1005 representing playable content included in the electronic device or search results for the input keyword may be displayed on the screen 261 of the augmented remote controller 200.

For content set as locked (or in a locked state), objects 1006 and 1007 (including a lock icon) may be displayed on the screen 261. The objects 1006 or 1007 (or lock icon) may indicate a locked status. The object 1006 indicating that a content has been set as locked by the user may be displayed separately from the object 1007 indicating that a content has an age limit.

If an electronic device (such as an image display apparatus, an external storage, or a DVD player) is locked, the augmented remote controller 200 may display a real image of the electronic device augmented with a lock icon, not with content information. If the lock icon is touched or a predetermined input is applied, a user authentication may be performed.

Once an electronic device is identified or determined, an operation for searching for contents and displaying the determined contents may be triggered automatically without a search command as in the example of FIG. 10.

The augmented remote controller 200 may display the locked contents on the display 260 after user authentication.

Upon input of a user authentication in operation S840, the controller 280 may control the locked contents by releasing or unlocking the contents in operation S850.

The identification unit 250 may recognize the voice, iris, finger print, and/or face of the user. Thus, the user authentication information may be information related to the recognized voice, iris, finger print, and/or face of the user that matches information about at least one of the pre-registered voice, iris, finger print, and/or face of the user.

The identification unit 250 may include a finger print reader for reading a finger print. If a finger print read by the finger print reader matches a pre-registered user's finger print, the controller 280 may release the locked contents (or unlock contents).

An augmented remote controller equipped with a finger print reader or a scanner may perform a user authentication operation in which a user's finger print is compared with a finger print that unlocks a locked content. As shown in FIG.

12, the screen 261 may serve as a finger print reader or a scanner. When the user touches the screen 261 with his finger 500 so that a finger print is left on the screen 261, the augmented remote controller 200 may determine whether the user's finger print matches a registered finger print. The augmented remote controller 200 may have a separately procured finger print reader or finger print reading unit.

if the user captures a particular object or arranges objects in a predetermined layout using the augmented remote controller 200, the locked contents may be released.

The augmented remote controller may unlock the locked contents by recognizing the voice, iris, and/or predetermined gesture of the user.

In an exemplary embodiment, the augmented remote controller 200 may further include an audio I/O unit for receiving a voice signal or a sensor unit for sensing movement of the user or the augmented remote controller 200. The controller 280 may release the locked contents, when a received voice signal matches a pre-registered user's voice or when a gesture input created based on sensed movement information matches with a pre-registered user's gesture.

Figure 13:
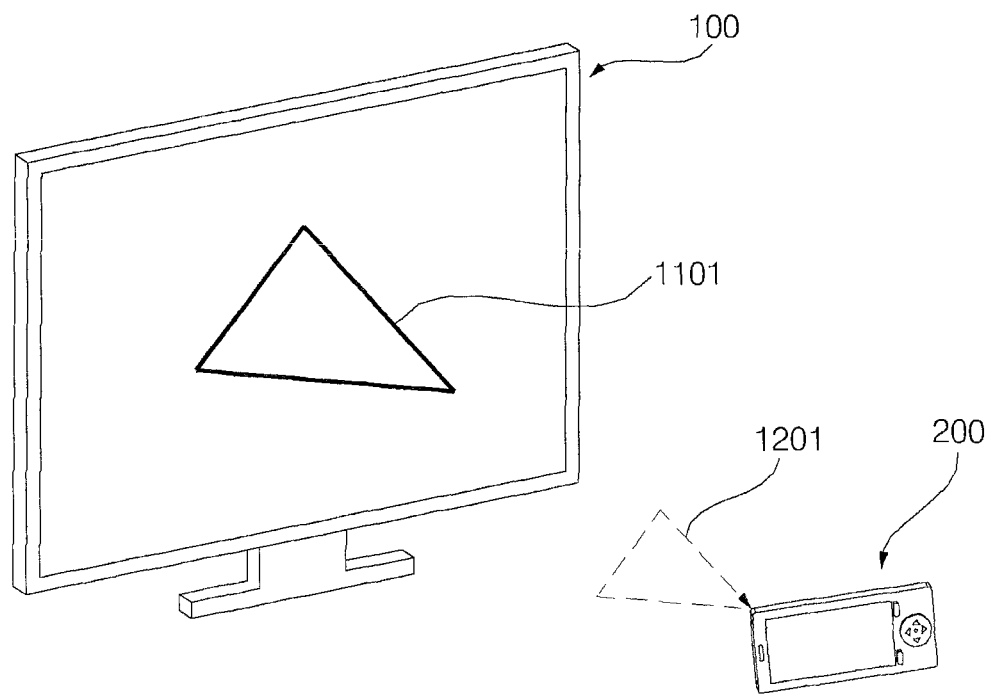

FIG. 13 shows an operation for sensing movement of the augmented remote controller and determining information about the sensed movement as an input signal, rather than directly sensing a user's gesture.

As shown in FIG. 13, when the user draws a triangle 1201 with the augmented remote controller 200, the triangular trace of the augmented remote controller 200 may be received as an input signal. The image display apparatus 100 may display an identified input signal 1101 on a screen so that the user may confirm what he or she has input.

The user authentication input may also be a password. The augmented remote controller may further include a user interface having an input device (e.g. a keypad) for allowing a user to enter a password. An input of a preset password may be the user authentication.

Figure 14:
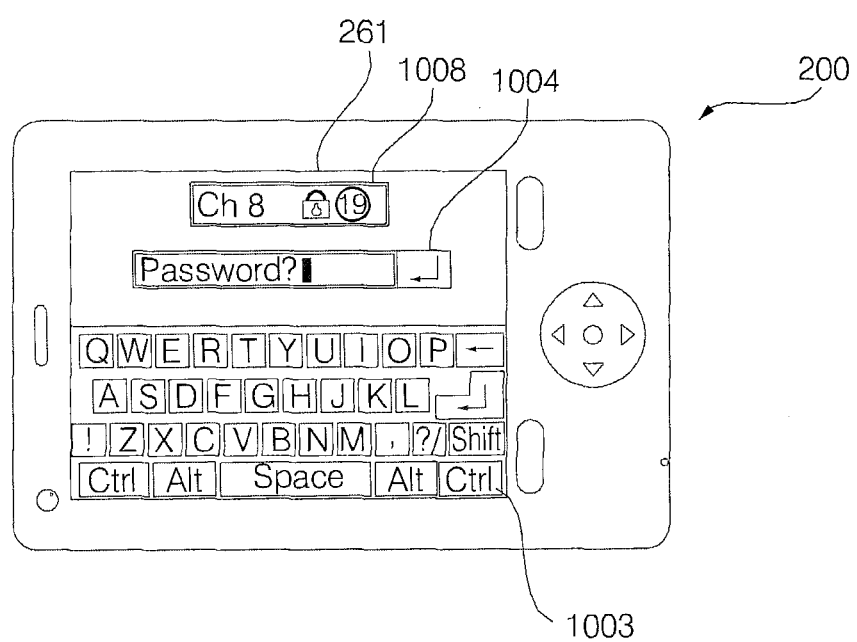

When a lock iron representing a locked status is touched or a predetermined input is received, a user authentication process may be triggered. As shown in FIG. 14, the screen 261 of the augmented remote controller 200 may display an object 1008 representing a content to be unlocked, the third object 1003 representing a keyboard, and the fourth object 1004 for displaying a character input through the third object 1003. The user may enter a password using the third object 1003 representing the keyboard.

If the password entered through the virtual keyboard displayed on the display 260 or the keypad matches an unlocking password, then the locked content may be released (or unlocked).

In an exemplary embodiment, the identification unit 250 may include a camera for capturing a still image or a video. If the captured still image or video matches a still image or video of a preset object or a preset layout of a plurality of objects, then the locked content may be released (or unlocked).

Figure 15:
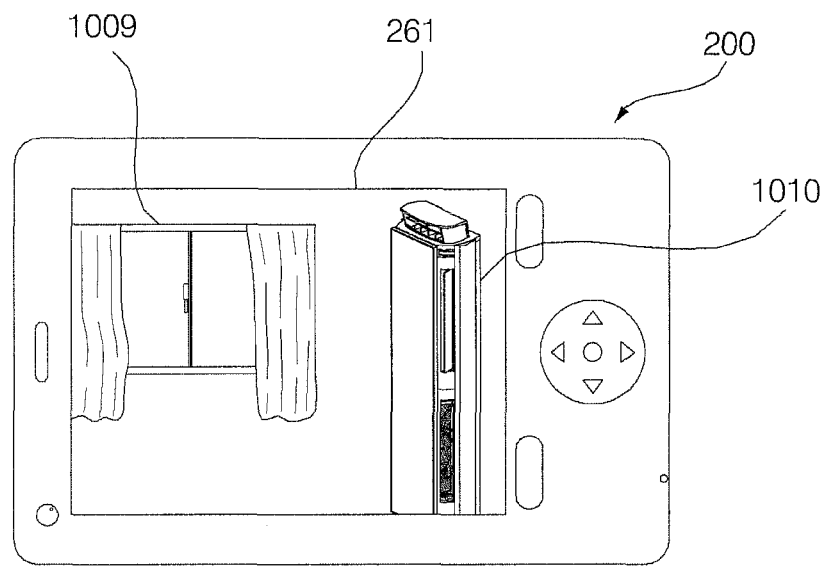

As shown in FIG. 15, a layout of particular indoor objects such as a window 1009 and an air conditioner 1010 may be captured and used as a user authentication password. During a later user authentication, the user may be authenticated based on similarity of a captured image of a layout of objects to a preset layout of the objects.

Additionally, the augmented remote controller 200 may release the locked content when an image of the face of the user captured by the camera matches a user's face registered for unlocking the locked content. The face matching may be determined by comparing a pattern of the recognized face with a pattern of the registered face.

If user information matches information that triggers unlocking of the locked content during the user authentication process, the augmented remote controller 200 may release the locked content and display information about the unlocked content on the display 260.

Figure 16:
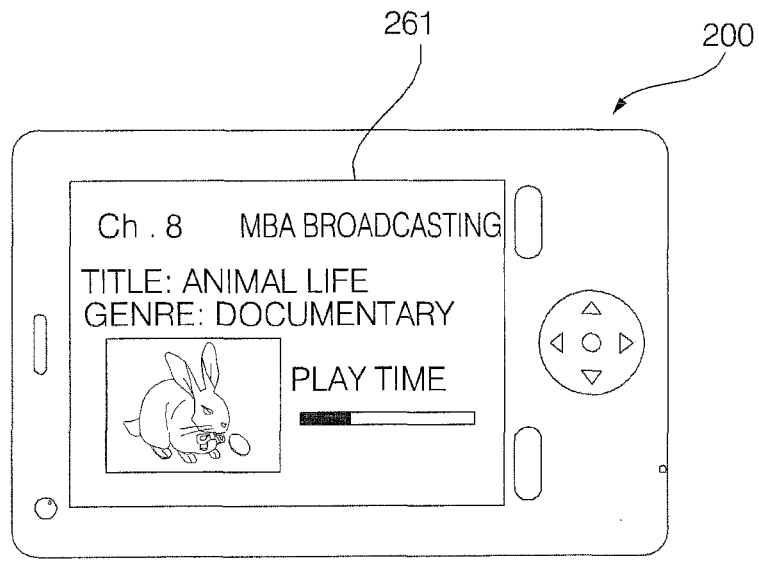

The information about the unlocked content may include a thumbnail image of the content, a title of the content, etc. As shown in FIG. 16, information about the unlocked content may include a title, a saved position, a source position, a thumbnail, a genre, of a play time of the content.

When thumbnails of unlocked contents are displayed on the display 260, the user may select one of the thumbnails and a content corresponding to the selected thumbnail may be played in a predetermined electronic device.

In an exemplary embodiment, the controller 280 may control the display 260 to display information regarding the unlocked content and may control the unlocked content to be played in the electronic device. That is, when the locked content is released, information regarding the content may be displayed. When the user later selects the content, the content may be played. Alternatively, as soon as the locked content is released, the content may be immediately played.

Figure 17:
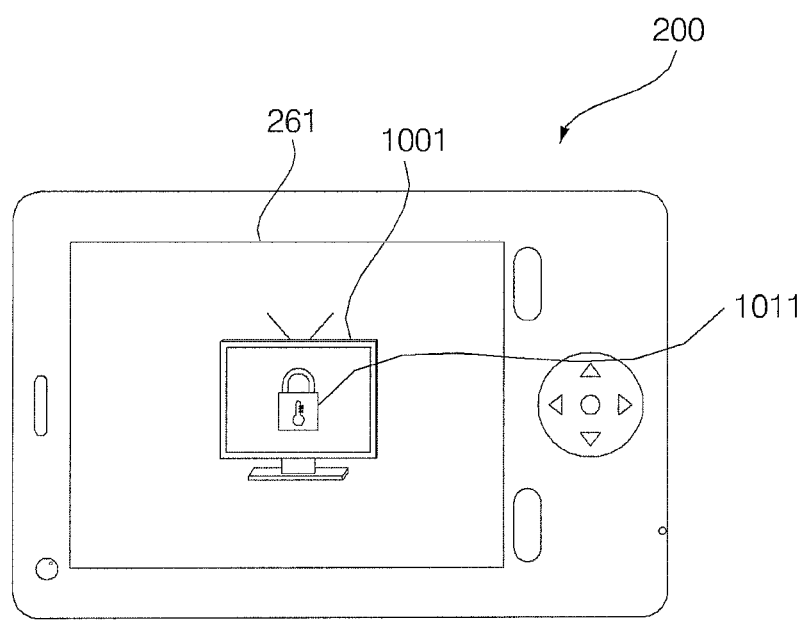
Figure 18:
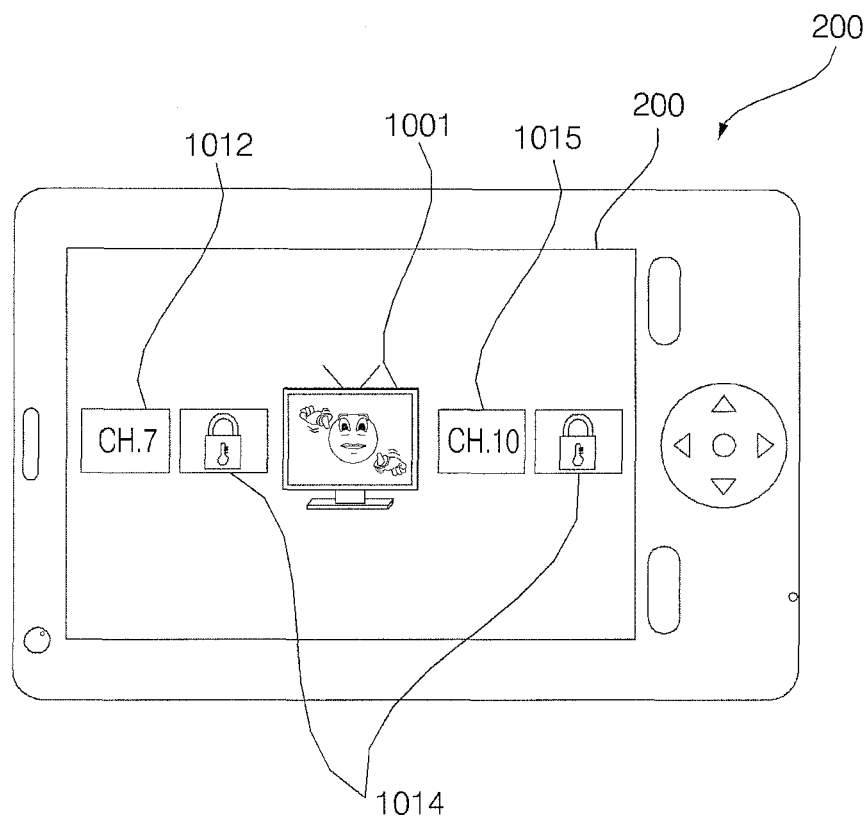

Referring to FIGS. 17 and 18, among objects displayed on the screen 261, the first object 1001 may represent the image display apparatus 100. The augmented remote controller 200 may identify or determine from the marker attached to the image display apparatus 100 that a current object captured by the camera is the image display apparatus 100 and the image display apparatus 100 is a controllable electronic device.

User authentication may be requested based on a type of the electronic device. For example, different users may set their passwords and user authentication inputs for a plurality of storages so that only an authorized user can access information in the storages. Alternatively, an image display apparatus may be set to be accessible only when a user authentication is from a parent.

The image display apparatus 100 may be in a powered-off state or in a standby state. In this example, when the augmented remote controller 200 identifies or determines the image display apparatus 100 and a last content or channel viewed through the image display apparatus 100 has been set as locked or has a limit for viewing, the object 1001 representing the image display apparatus 100 may be augmented with the object 1011 indicating a locked status, as shown in FIG. 17.

Referring to FIG. 18, when the user searches for previous channels and/or next channels, the object 1001 may be augmented with objects 1012 and 1015 representing the previous and next channels, respectively. In this example, if the previous channel and/or the next channel is locked or has a limit for viewing, an object 1014 indicating locked or viewing-limited may be displayed.

Upon receipt of a proper user authentication input that triggers unlocking of a locked channel, the augmented remote controller 200 may display the channel and content information.

Figure 19:
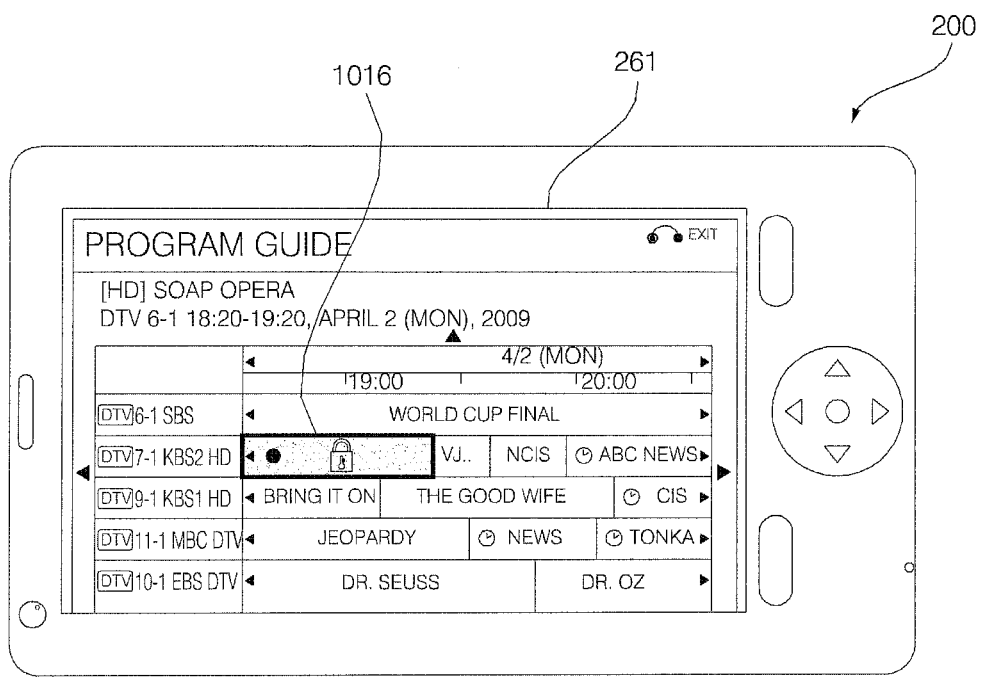

FIG. 19 illustrates an example of a list of broadcast program information displayed on a display of an augmented remote controller, when an EPG view command is issued. At least one of the broadcast programs of channels may have an age limit. When a user selects a locked content in the EPG list, a proper user authentication may be requested and an object 1016 indicating age-limited may be displayed at a position for information about the locked content. When a user authentication input is received confirming that the user is an adult, information regarding the locked content may be displayed.

Figure 20:
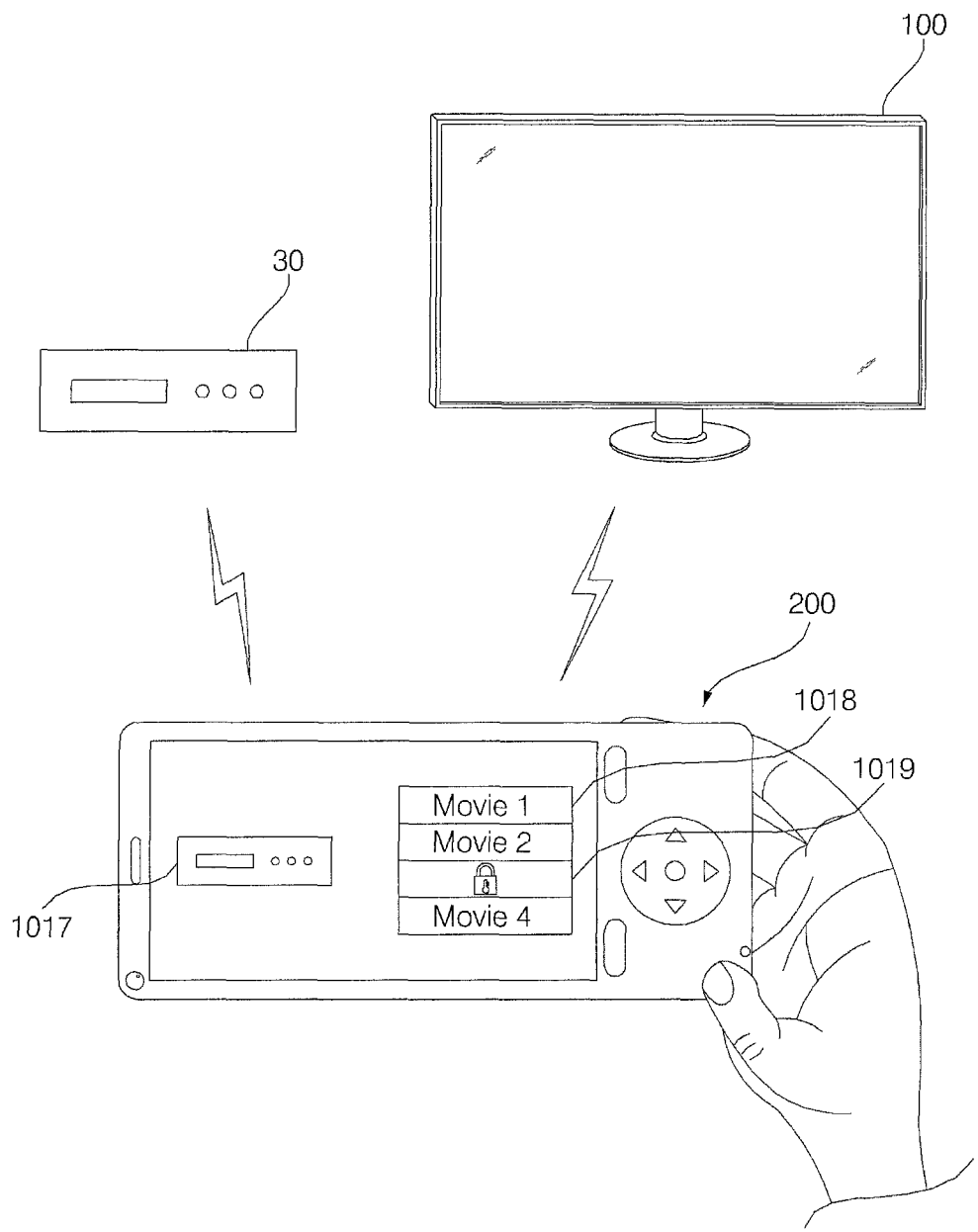

FIG. 20 shows the external device 30, the image display apparatus 100, and the augmented remote controller 200. The augmented remote controller 200 may display an object 1017 representing the external device 30 and an object 1018 representing contents available in the external device 30 by augmented reality.

In a presence of a locked content from among the contents, information about the locked content may be augmented with an object 1019 indicating a locked status.

Figure 21:
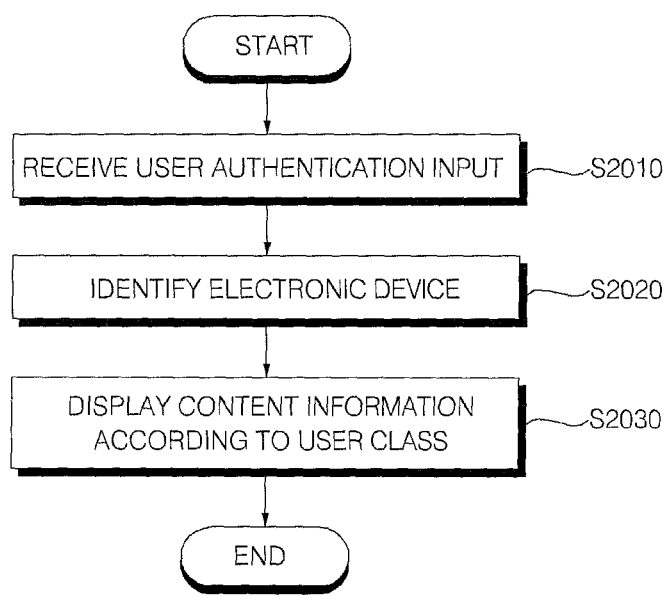
FIG. 21 is a flowchart illustrating a method for operating an augmented remote controller according to an exemplary embodiment of the present invention.

FIG. 21 is a flowchart illustrating a method for operating an augmented remote controller according to an exemplary embodiment of the present invention. Other operations and embodiments may also be provided. A repetition of the description made of FIG. 8 may be omitted or given in brief.

As shown in FIG. 21, a user authentication input may be received in operation S2010, an electronic device may be identified or determined in operation S2020, information regarding contents that can be played by the electronic device may be displayed based on the user authentication input in operation S2030.

That is, a user may be identified or determined by receiving a user authentication input. Thus, only contents for which the user is authorized may be displayed, and/or the other contents may be displayed in a limited manner, using an object indicating a locked status.

Registering a user authentication setting may further be performed. The user authentication setting may include user information, a user authentication input method, and/or a user access class.

The user authentication setting may include an appropriate user authentication method that can identify a user, aside from a user name or a user ID. For example, the finger print, iris and/or face of the user, and/or a photo of an object may be registered, and/or a password may be set.

Additionally, the user authentication setting may include a user access class. For example, if a user turns out to be a family member under the age that is allowed to access a content, the content may be locked or prevented from viewing.

The information regarding the contents may be displayed in a different manner according to the user authentication input in the content information display operation S2030. Thus, a personalized menu and personalized contents may be provided, a user's privacy may be protected, and the user may use appropriate contents.

In an exemplary embodiment, only information about contents allowed for the user according to the user authentication input may be displayed in operation S2030. Alternatively, in the presence of a content inaccessible to the user according to the user authentication input, an object indicating a locked status may be displayed in operation S2030, as shown in FIG. 20.

Figure 22:
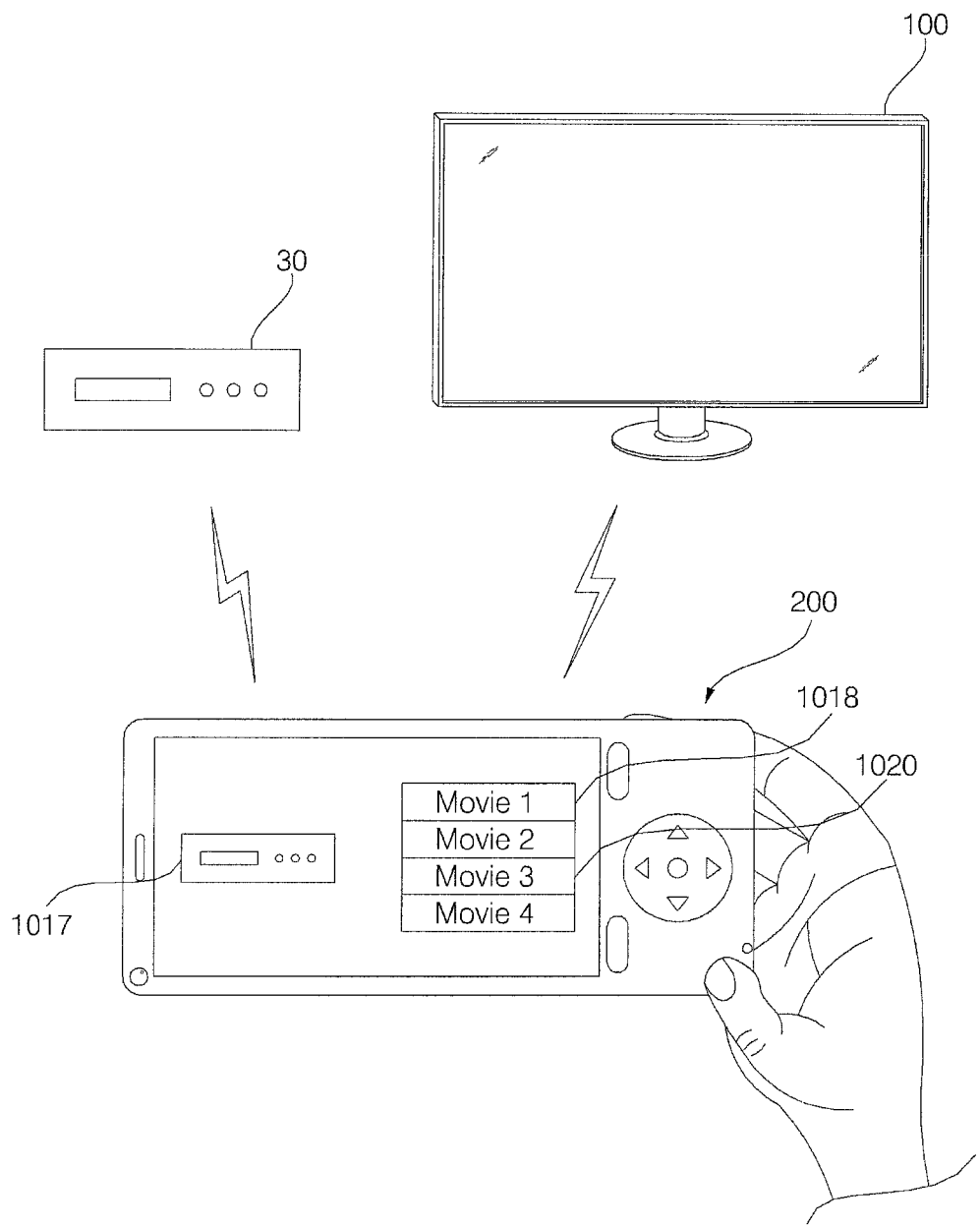
FIGS. 22 and 23 are views for describing operations of an augmented remote controller according to exemplary embodiments of the present invention.
Figure 23:
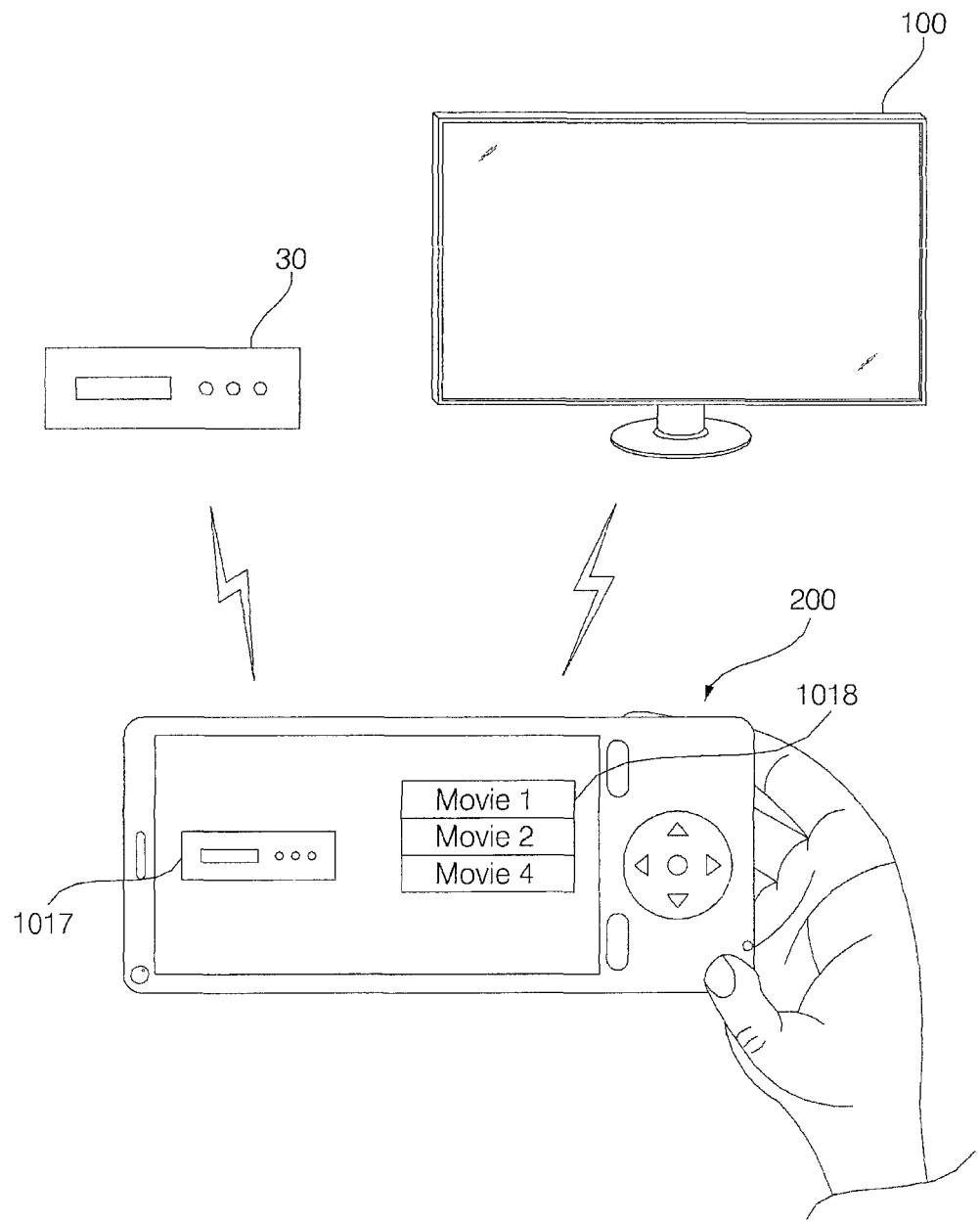

FIGS. 22 and 23 illustrate content information displayed after user authentication differentiated for different users. In FIGS. 22 and 23, the image display apparatus 100 may be connected to the same external device 30 as shown in FIG. 20, for example.

Referring to FIG. 22, in an example of a content allowed only for adults, when a father is authenticated by user authentication, the locked content may be released and thus information regarding the content may be displayed as content information 1020, compared to FIG. 20.

If an underage family member is subjected to the user authentication process, the information regarding the locked content may not be displayed as shown in FIG. 23. That is, the underage family member may not even be aware of the presence of the locked content.

An image display apparatus or an external device connected to the image display apparatus can be controlled by use of a single remote controller. Additionally, a user can efficiently use and manage contents played or stored in the image display apparatus or the external device connected to the image display apparatus, and information related to the contents.

A safe and convenient locking and unlocking function and a privacy protection function may be implemented for contents playable in an electronic device, such as an image display apparatus or an external device. Individual users' tastes may be reflected and security may be ensured. Therefore, user convenience may be increased.

The method for operating the augmented remote controller may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an image display on a remote controller based on augmented reality, the method comprising:

capturing, by a camera that includes an identification unit, a real image around a user;

identifying, via the identification unit, an electronic device having playable content in the real image that is captured by the camera;

receiving, via a wireless communication module, information regarding a locked status of the playable content of the identified electronic device;

displaying, on a screen, an object indicating a locked status, wherein the object is displayed on the screen with the real image captured by the camera when the playable content of the identified electronic device requires a user authentication for playing the content;

receiving a user authentication input;

determining whether the received user authentication input matches a previously stored user authentication information;

releasing the playable content from the locked status when it is determined that the received user authentication input matches the previously stored user authentication information; and displaying, on the screen, information relating to the released playable content.

2. The method according to claim 1, wherein displaying the object indicating the locked status includes displaying, on the screen, an object corresponding to the identified electronic device while simultaneously displaying the object indicating the locked status.

3. The method according to claim 1, wherein the playable content having the locked status is one content having an age limit for viewing or content set as locked by a user.

4. The method according to claim 1, wherein receiving the information of the locked status includes receiving the information of the locked status from the identified electronic device.

5. The method according to claim 1, further comprising accessing a network server or a home server over a wireless communication network, wherein receiving the information regarding the locked status includes receiving the information regarding the locked status of the playable content from the network server or the home server.

6. The method according to claim 1, wherein the user authentication input is input of one of voice information, iris information, finger print information, gesture information, or face information of a user.

7. The method according to claim 1, wherein the user authentication input is an input of a still image of at least one object or a moving picture of at least one object.

8. The method according to claim 1, wherein the user authentication input includes a password input.

9. The method according to claim 1, wherein the displayed information regarding the released playable content includes information relating to one of a title, a saved position, a source position, a thumbnail image, a genre, or a play time of the released playable content.

10. A remote controller comprising:
an identification unit to capture a real image around a user by a camera and to identify an electronic device having playable content in the real image that is captured by the camera;
a wireless communication unit to receive information regarding a locked status of the playable content of the identified electronic device;
a display to provide an image display based on augmented reality; and
a controller to control the display to display the real image captured by the camera, and to control the display to display an object indicating a locked status on the display with the displayed real image when the playable content of the identified electronic device requires a user authentication for playing the content, the controller to determine whether a received user authentication input matches a previously stored user authentication information, and to release the playable content from the locked status when it is determined that the received user authentication input matches the previously stored user authentication information, and the controller to control the display to display information relating to the released playable content.

11. The remote controller according to claim 10, wherein the user authentication input is an input of a still image of at least one object or a moving picture of at least one object.

12. The remote controller according to claim 10, wherein the playable content having the locked status is content having an age limit for viewing or content set as locked by a user.

13. The remote controller according to claim 10, wherein the remote controller receives the information of the locked status includes receiving the information of the locked status of the playable content from the identified electronic device.

14. The remote controller according to claim 10, wherein the user authentication input is one of voice information, iris information, finger print information, gesture info nation, or face information of a user.

15. The remote controller according to claim 10, wherein the user authentication input includes a password input.

16. A method of controlling an image display on a remote controller based on augmented reality, the method comprising:
registering a user authentication setting;
receiving a user authentication input at the remote controller;
capturing, by a camera that includes an identification unit, a real image around a user,
identifying, via the identification unit, an electronic device in the real image captured by the camera;
displaying, on the screen, the real image captured by the camera; and
displaying, on the screen, information regarding playable content in the identified electronic device based on the user authentication input and based on the registered user authentication setting, wherein the information is displayed on the screen while displaying the real image captured by the camera.

17. The method according to claim 16, wherein the user authentication setting includes one of user information, a user authentication input method, or a user access class.

18. The method according to claim 16, wherein displaying the information includes displaying the info nation regarding the contents differently based on the user authentication input.

19. The method according to claim 16, further comprising displaying an object that indicates a locked status when a content is not allowed for a user corresponding to the user authentication input.

20. The method according to claim 16, wherein displaying the information includes displaying only information about a content allowed for a user corresponding to the user authentication input.

* * * * *